United States Patent
Kawamura

(10) Patent No.: US 9,578,214 B2
(45) Date of Patent: Feb. 21, 2017

(54) IMAGE PICKUP APPARATUS WITH AIR COOLING UNIT

(71) Applicant: CANON KABUSHIKI KAISHA, Tokyo (JP)

(72) Inventor: Ayumu Kawamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/970,661

(22) Filed: Aug. 20, 2013

(65) Prior Publication Data

US 2014/0055667 A1 Feb. 27, 2014

(30) Foreign Application Priority Data

Aug. 27, 2012 (JP) .................... 2012-186554

(51) Int. Cl.
*H04N 5/225* (2006.01)
*G02B 7/02* (2006.01)

(52) U.S. Cl.
CPC ............ *H04N 5/2252* (2013.01); *G02B 7/028* (2013.01); *H04N 5/2253* (2013.01)

(58) Field of Classification Search
CPC .............................. H04N 5/2252; H04N 5/2253
USPC ................ 348/207.99, 208.99, 208.5, 208.7, 348/208.11, 208.12, 373, 374, 375, 376
See application file for complete search history.

(56) References Cited

U.S. PATENT DOCUMENTS 6,113,485 A    9/2000  Marquis et al.
7,839,451 B2 * 11/2010  Bleau .................. H04N 5/2252
                                                      348/340
2006/0098117 A1 *  5/2006  Kajihara et al. ............... 348/373
2006/0256199 A1   11/2006  Takahashi et al.
2007/0002148 A1    1/2007  Takahashi et al.
2009/0002549 A1    1/2009  Kobayashi
2009/0225511 A1    9/2009  Hsu et al.
2009/0225522 A1    9/2009  Mori
2009/0244363 A1 * 10/2009  Sugimura et al. ............ 348/374

FOREIGN PATENT DOCUMENTS

CN      1774042 A      5/2006
CN      1863274 A     11/2006
CN    101334579 A     12/2008
JP    2004104632 A      4/2004

(Continued)

OTHER PUBLICATIONS

Office Action issued in U.S. Appl. No. 13/972,200, mailed Jun. 26, 2015.

(Continued)

*Primary Examiner* — Ahmed A Berhan
(74) *Attorney, Agent, or Firm* — Rossi, Kimms & McDowell LLP

(57) ABSTRACT

An image pickup apparatus that is excellent in rigidity and in heat radiation efficiency. The image pickup apparatus has a heat sink-cum-duct disposed between a pair of cover members that constitute left and right exteriors of an apparatus main unit and that are fixed to the heat sink-cum-duct. The heat sink-cum-duct has an opening formed to correspond to an air inlet port of an air cooling fan and has a plurality of fins, and sucks air through the opening from the outside. The sucked air is guided to the air inlet port of the cooling fan through a ventilation path defined by the plurality of fins.

8 Claims, 29 Drawing Sheets

(56) References Cited

FOREIGN PATENT DOCUMENTS

| | | | |
|---|---|---|---|
| JP | 2006295855 A | 10/2006 |
| JP | 2007172076 A | 7/2007 |
| JP | 200925706 A | 2/2009 |
| JP | 2009-296469 A | 12/2009 |
| JP | 2010130571 A | 6/2010 |

OTHER PUBLICATIONS

Office Action issued in U.S. Appl. No. 13/972,200, mailed Dec. 3, 2014.
Non-Final Office Action issued in U.S. Appl. No. 13/972,200, dated Oct. 14, 2015.
Office Action issued in CN201310360975.0, mailed Sep. 14, 2015. English translation provided.
Office Action issued in Japanese Application No. 2012186554 mailed May 10, 2016.
Office Action issued in Chinese Appln. No. 201310361582.1 mailed Mar. 11, 2006. English translation provided.
Final Office Action issued in U.S. Appl. No. 13/972,200, dated Feb. 12, 2016.

\* cited by examiner

IMAGE PICKUP APPARATUS WITH AIR COOLING UNIT

BACKGROUND OF THE INVENTION

Field of the Invention

The present invention relates to an image pickup apparatus such as a digital camera or a digital video camera mounted with an air cooling unit.

Description of the Related Art

An image pickup apparatus such as digital video camera mounted with an air cooling unit has been known. For example, there has been proposed a video camera that has a cooling fan disposed inside an exterior casing of the video camera (Japanese Laid-open Patent Publication No. 2009-296469). In this proposal, an air inlet port formed in the exterior casing of the video camera is connected through a ventilation duct to the cooling fan, thereby sucking a sufficient amount of air for heat radiation into inside the video camera to efficiently cool camera component parts that generate heat.

In recent image pickup apparatuses such as digital cameras, an amount of heat generated in a circuit board increases with enhancement of apparatus functionality. As a result, it becomes difficult to achieve a sufficient heat radiation effect by the above-described heat radiation structure where the air inlet port is connected to the cooling fan through the ventilation duct. In addition, image pickup apparatuses of this type do not have a sufficient rigidity against external compression and torsion. To increase the rigidity, reinforcing members must be added, resulting in increased cost.

SUMMARY OF THE INVENTION

The present invention provides an image pickup apparatus that is excellent in rigidity and in heat radiation efficiency.

According to the present invention, there is provided an image pickup apparatus comprising an air cooling fan configured to have an air inlet port and an air outlet port, a heat sink-cum-duct configured to have an opening formed to correspond to the air inlet port of the air cooling fan and have a plurality of fins that define a ventilation path for guiding air sucked from outside through the opening to the air inlet port of the air cooling fan, and a pair of cover members disposed facing each other and configured to form a part of an exterior of an apparatus main unit, wherein the heat sink-cum-duct is disposed between the pair of cover members, and the pair of cover members are fixed to the heat sink-cum-duct.

With this invention, the rigidity of the image pickup apparatus can be increased without adding reinforcing members, and the heat radiation efficiency can be improved to thereby achieve a sufficient heat radiation effect.

Further features of the present invention will become apparent from the following description of exemplary embodiments with reference to the attached drawings.

DESCRIPTION OF THE EMBODIMENTS

The present invention will now be described in detail below with reference to the drawings showing preferred embodiments thereof.

First Embodiment

Figure 1A:
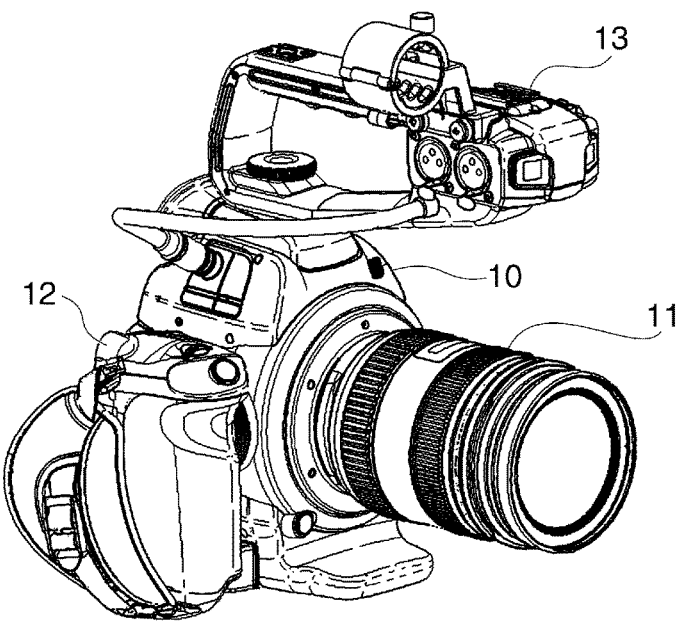
FIG. 1A is an external perspective view of a digital camera serving as an image pickup apparatus according to a first embodiment of this invention.
Figure 1B:
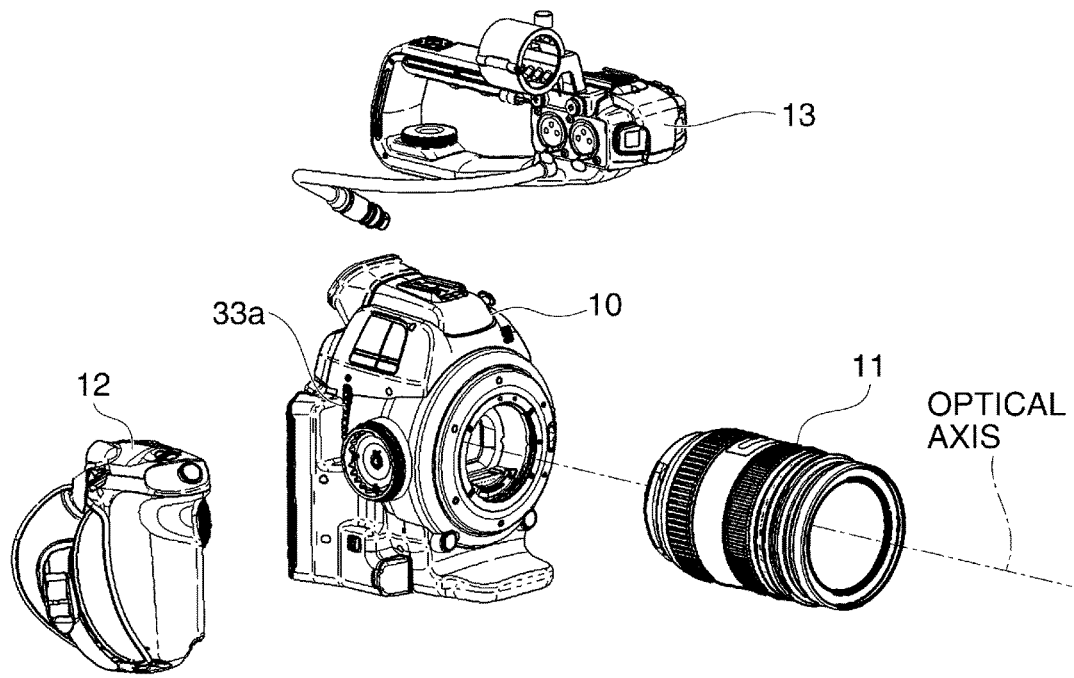
FIG. 1B is a perspective view showing a state where a lens barrel, a grip, and a handle of the digital camera are detached from a camera main unit.

FIG. 1A shows in external perspective view a digital camera serving as an image pickup apparatus according to a first embodiment of this invention, and FIG. 1B shows in perspective view a state where a lens barrel, a grip, and a handle of the digital camera are detached from a camera main unit.

As shown in FIGS. 1A and 1B, the digital camera of this embodiment has the camera main unit 10 (apparatus main unit) to which the lens barrel 11, grip 12, and handle 13 can be detachably mounted. Each of the lens barrel 11, grip 12, and handle 13 has an input/output unit (e.g., connectors such as a jack), and is electrically connected to the camera main unit 10 through the input/output unit when mounted to the camera main unit 10.

Figure 2A:
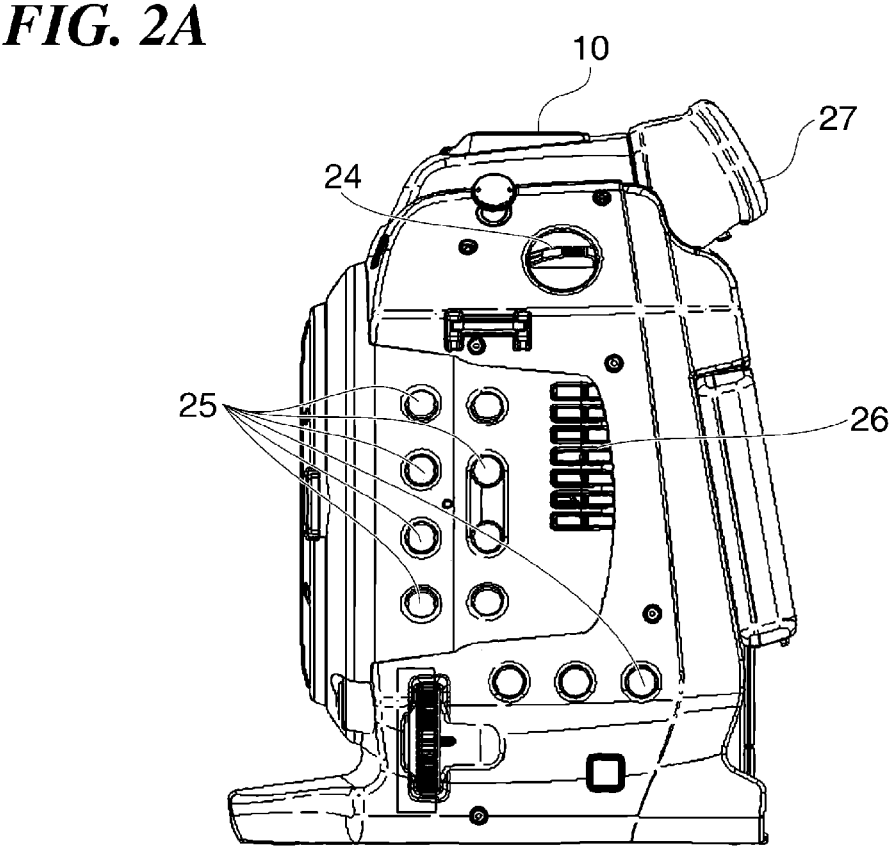
FIG. 2A is a left side view of the camera main unit.
Figure 2B:
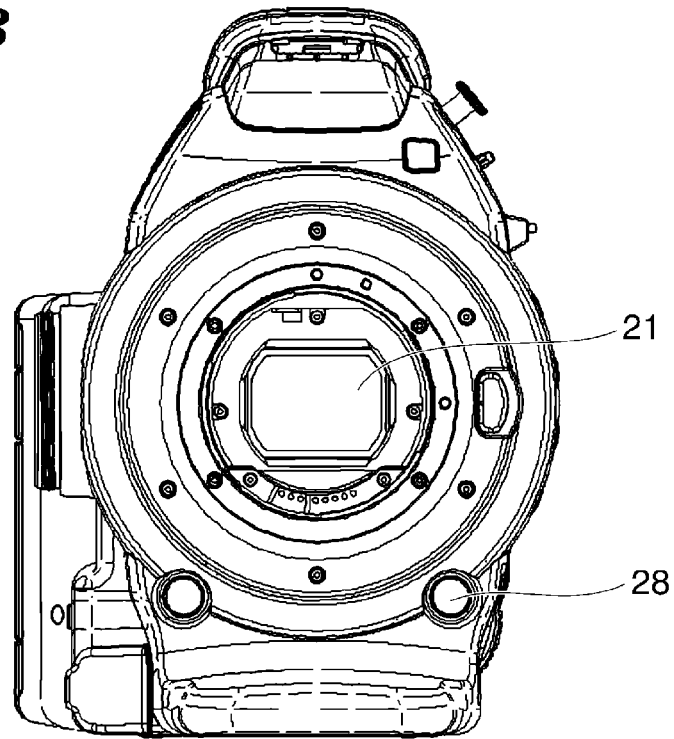
FIG. 2B is a front view of the camera main unit.

FIGS. 2A and 2B respectively show the camera main unit 10 in left side view and in front view. The camera main unit 10 is provided with a power source dial 24, operation buttons 25, an air outlet port 26, and a view finder 27 which are shown in FIG. 2A, and also provided with an image sensing device 21 (such as a CMOS sensor or a CCD sensor) and a photographing button 28 which are shown in FIG. 2B. Furthermore, an air inlet port 33a for air cooling is provided in the camera main unit 10, as shown in FIG. 1B.

Figure 3:
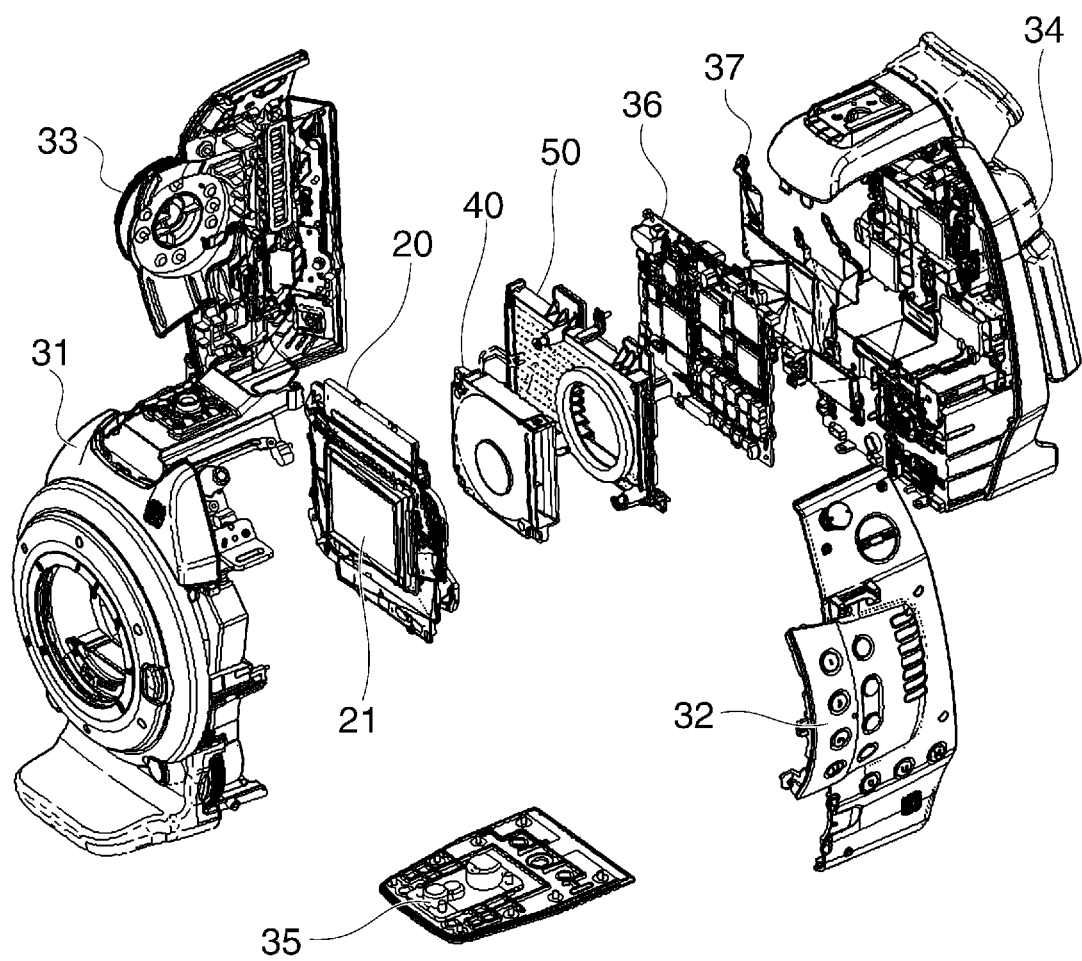
FIG. 3 is an exploded perspective view showing an internal structure of the camera main unit.

FIG. 3 shows an internal structure of the camera main unit 10 in exploded perspective view. As shown in FIG. 3, the camera main unit 10 has a front cover unit 31, left and right cover units 32, 33 (a pair of cover members), a rear cover unit 34, and a bottom cover unit 35. These units 31 to 35 form a front exterior, left and right exteriors, a rear exterior, and a bottom exterior of the camera main unit 10, respectively.

Inside the camera main unit 10, there are disposed an image pickup unit 20 (including the image sensing device 21), an air cooling fan, e.g., a centrifugal fan 40 for heat radiation, a heat sink-cum-duct 50, a main circuit board 36, and a heat radiation plate 37.

The heat radiation plate 37 is made of a copper plate, an aluminum plate, or the like, which is excellent in thermal conductivity. The main circuit board 36 is electrically connected with various electronic devices of the digital camera, consumes large electric power, and generates heat. The main circuit board 36 is electrically connected also with the image pickup unit 20, centrifugal fan 40, power source dial 24, operation buttons 25, and photographing button 28.

The centrifugal fan 40 and the heat sink-cum-duct 50 are disposed on a camera's optical axis between the image pickup unit 20 and the main circuit board 36, thereby achieving an effect of making it difficult for heat to transfer from the main circuit board 36 to the image pickup unit 20. It should be noted that a heat insulation effect can be achieved even when only either the centrifugal fan 40 or the heat sink-cum-duct 50 is disposed.

All of the image pickup unit 20, centrifugal fan 40, heat sink-cum-duct 50, main circuit board 36, and heat radiation plate 37 are each formed into a flat shape having a short dimension in the optical axis direction. In this embodiment, the centrifugal fan 40, heat sink-cum-duct 50, main circuit board 36, and heat radiation plate 37 are disposed nearly parallel to the image pickup unit 20. The front and rear cover units 31, 34 are each also formed into a flat shape having a short dimension in the optical axis direction and disposed nearly parallel to the image pickup unit 20. Thus, a length dimension of the camera main unit 10 in the optical axis direction can be reduced.

By disposing the image pickup unit 20, centrifugal fan 40, heat sink-cum-duct 50, main circuit board 36, and heat radiation plate 37 along the optical axis, a width dimension of the camera main unit 10 can also be reduced.

Figure 4:
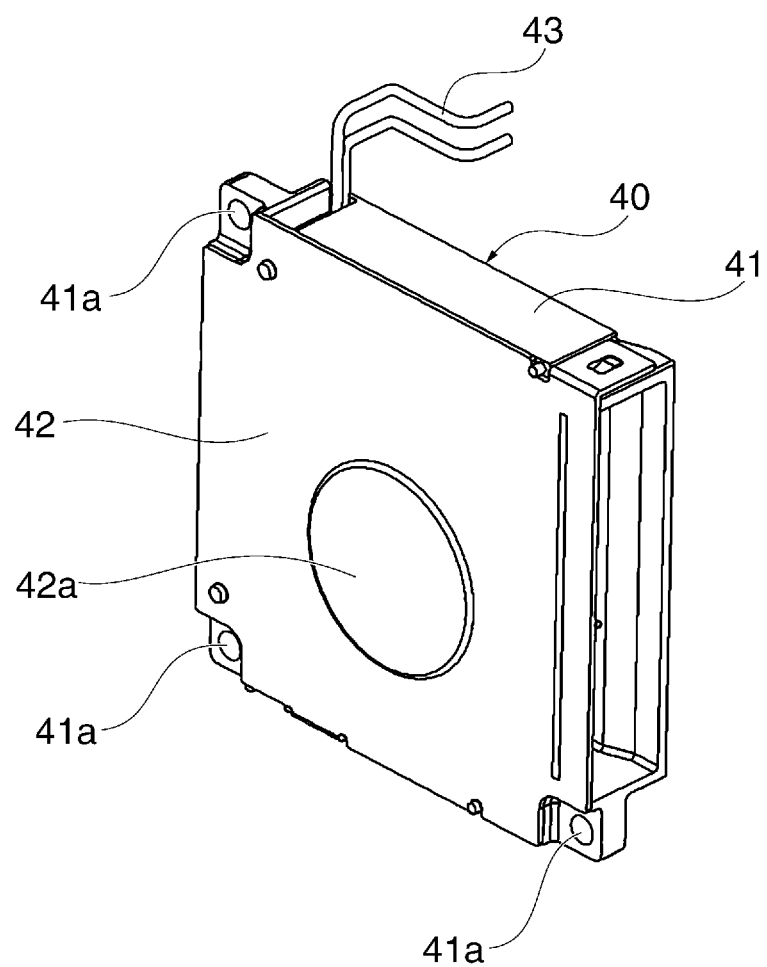
FIG. 4 is a front perspective view of a centrifugal fan.
Figure 5A:
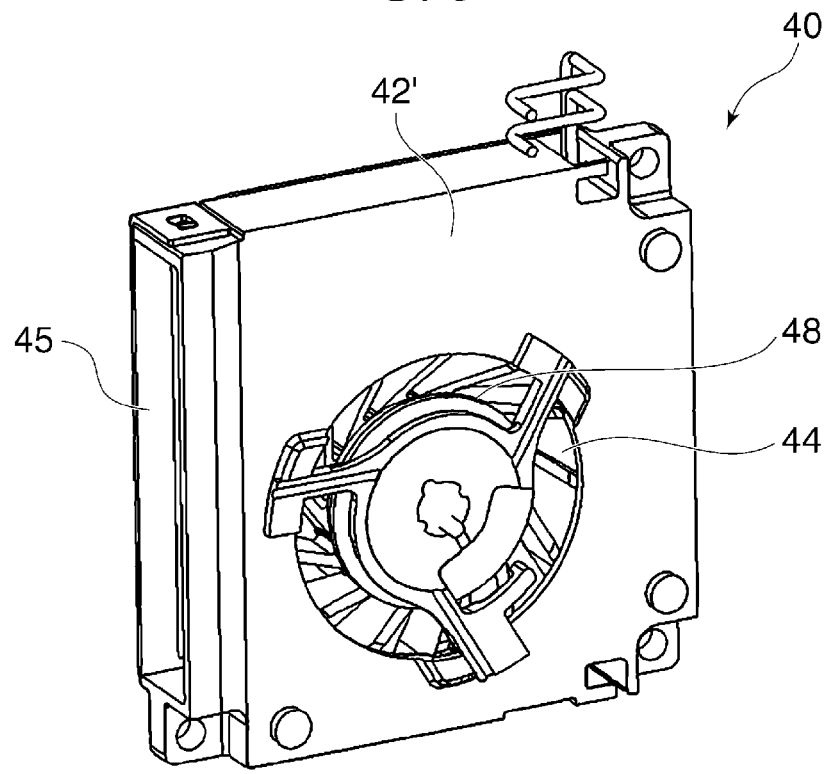
FIG. 5A is a rear perspective view of the centrifugal fan.
Figure 5B:
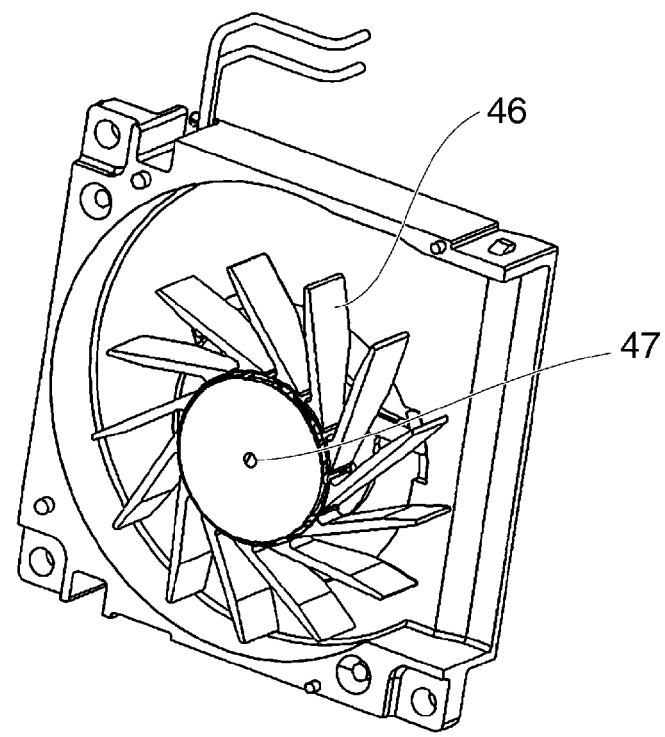
FIG. 5B is a perspective view showing a state where a rear lid plate is detached from the centrifugal fan.

FIG. 4 shows the centrifugal fan 40 in perspective view as seen from a front side of the camera main unit 10, FIG. 5A shows the centrifugal fan 40 in perspective view as seen from a rear side, and FIG. 5B shows in perspective view a state where a rear lid plate is detached from the centrifugal fan 40.

As shown in FIGS. 4 and 5A, the centrifugal fan 40 has a main body 41 formed by e.g. aluminum die casting, and front and rear lid plates 42, 42' made of aluminum or the like. An exterior of the centrifugal fan 40 is formed by the main body 41 and the lid plates 42, 42'. The lid plate 42 is formed at its central portion with a circular convex portion 42a. The main body 41 is formed with screw holes 41a with which screws 51 (see FIG. 8) for fixing the centrifugal fan 40 to a heat sink 61 (described later) are threadedly engaged. The centrifugal fan 40 is provided with wires 43 for electrically connecting the fan 40 with the main circuit board 36.

As shown in FIG. 5A, the centrifugal fan 40 has a rear face provided with an air inlet port 44 in which a fan circuit board 48 is disposed, and has a side face provided with an air outlet port 45 so as to correspond to the air outlet port 26 (FIG. 2A) of the camera main unit 10. In the centrifugal fan 40, there are provided, as shown in FIG. 5B, blades 46 for sucking air from the air inlet port 44 and discharging air from the air outlet port 45 when rotated, and a motor 47 for rotating the blades 46. The motor 47 has a tip end fitted to the convex portion 42a of the lid plate 42.

The motor 47 and the wires 43 are electrically connected to each other through the fan circuit board 48. The fan circuit board 48 is provided with a Hall element for detecting passage of a magnet provided in one of the blades 46. Based on an output from the Hall element, rotation speed of the blades 46 is feedback controlled. A tip end of a shaft of the motor 47 is radially supported for rotation by a sintered metal sleeve bearing impregnated with lubricating material, and retained by a wear-resistant member in an axial direction (thrust direction).

Figure 6A:
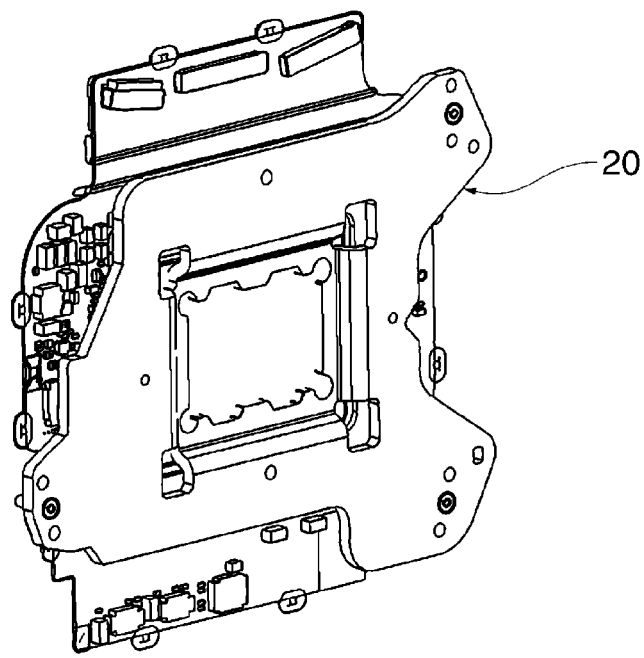
FIG. 6A is a perspective view of an image pickup unit.
Figure 6B:
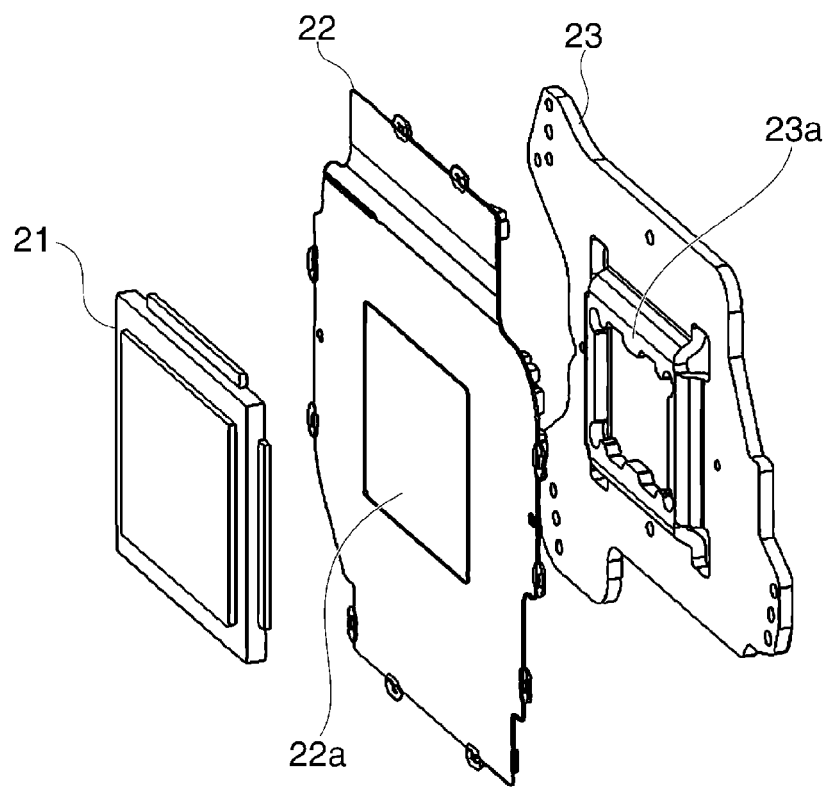
FIG. 6B is an exploded perspective view of the image pickup unit.

FIGS. 6A and 6B respectively show the image pickup unit 20 in perspective view and in exploded perspective view.

As shown in FIGS. 6A and 6B, the image pickup unit 20 has the image sensing device 21, a device circuit board 22 having a central portion thereof formed with a hole 22a, and a device plate 23 made of aluminum or the like. The device plate 23 holds the image sensing device 21 and discharges heat generated in the image sensing device 21.

The device plate 23 has a central portion provided with a convex portion 23a that projects toward the image sensing device 21. The device plate 23 is fixed by e.g. ultraviolet-curing adhesive to the image sensing device 21 in a state that the convex portion 23a is inserted through the hole 22a of the device circuit board 22 and made in contact with a rear surface of the image sensing device 21. The image sensing device 21 is electrically connected by e.g. soldering to the device circuit board 22 that is electrically connected to the main circuit board 36 through wires (not shown).

Figure 7A:
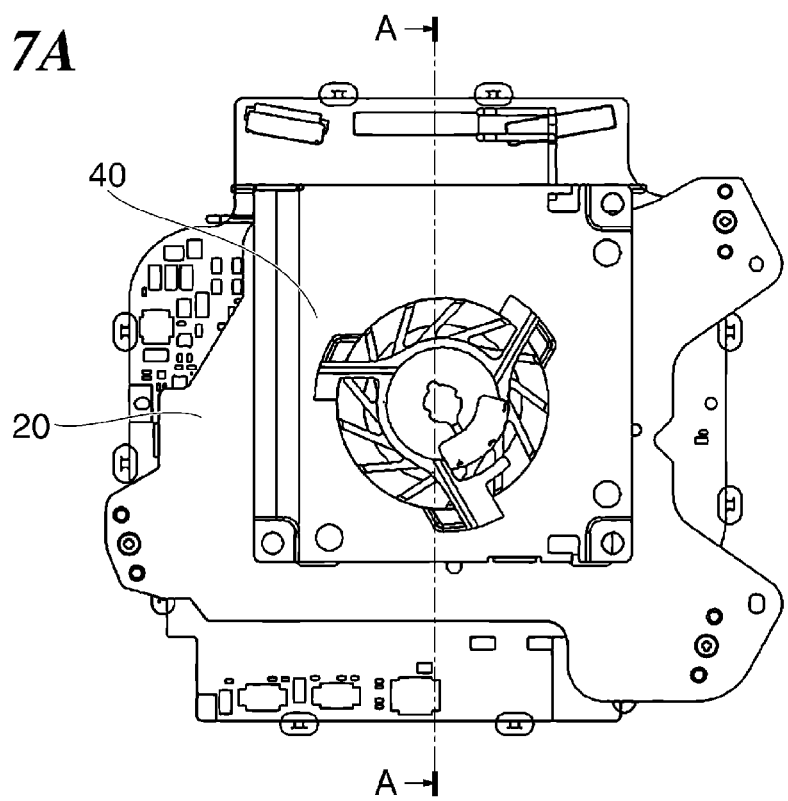
FIG. 7A is a rear view of the image pickup unit and the centrifugal fan.
Figure 7B:
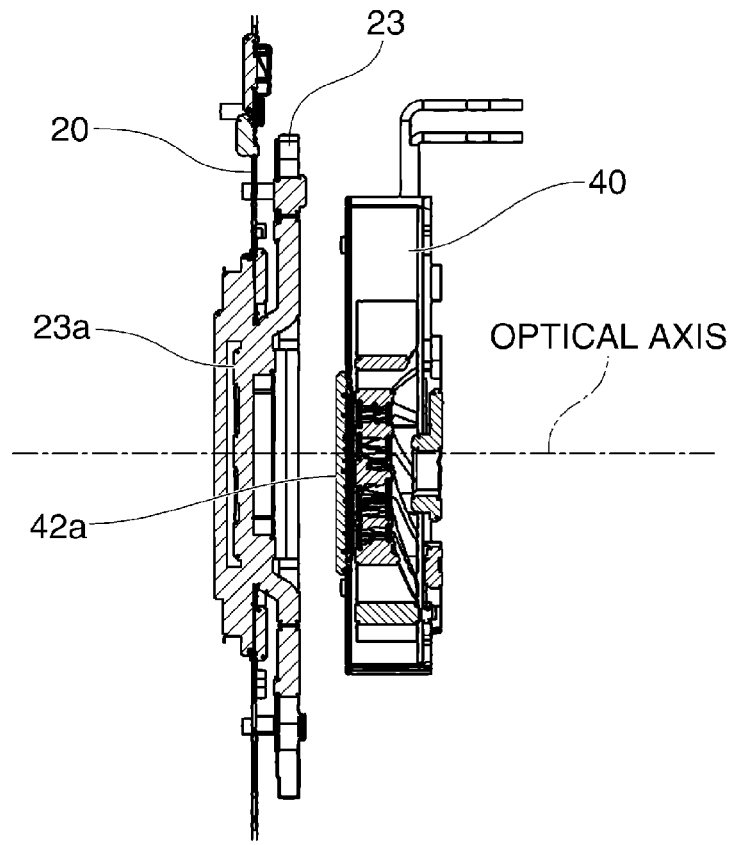
FIG. 7B is a section view taken along line A-A shown in FIG. 7A.

FIG. 7A shows the image pickup unit 20 and the centrifugal fan 40 as seen from the rear side of the camera main unit 10, and FIG. 7B is a section view taken along line A-A shown in FIG. 7A.

As shown in FIGS. 7A and 7B, the centrifugal fan 40 is disposed on the rear side of the image pickup unit 20 as viewed in the optical axis direction so as to be parallel to and close to the image pickup unit 20. The convex portion 42a of the centrifugal fan 40 is inserted in the optical axis direction into a concave portion that is formed in a rear face of the convex portion 23a of the device plate 23 of the image pickup unit 20. Accordingly, the image pickup unit 20 and the centrifugal fan 40 are disposed close to each other in the optical axis direction, whereby the length dimension of the camera main unit 10 in the optical axis direction can be made shorter as compared with a case where no concave portion is formed in the device plate 23.

When the centrifugal fan 40 takes such an orientation that a rotation axis of the fan 40 extends nearly parallel to the direction of gravity, a shaft of the motor 47 sometimes abnormally vibrates such as to beat the bearing, resulting in undesired abnormal sound. This also applies to an axial-flow fan.

At the time of photographing, the digital camera usually takes such an orientation that the camera's optical axis extends perpendicular to the direction of gravity. In the case of the digital camera of this embodiment where the centrifugal fan 40 is disposed nearly parallel to the image sensing device 21, the centrifugal fan 40 takes an orientation where it is disposed nearly perpendicular to the direction of gravity at the time of photographing, and therefore, there is no fear that abnormal vibration is caused. It should be noted that since the centrifugal fan 40 is disposed near and substantially parallel to the image sensing device 21 and the rotation axis of the fan 40 is aligned with the center of the image sensing device 21, abnormal vibration of the centrifugal fan 40 becomes difficult to occur irrespective of the orientation of the digital camera at the time of photographing.

It should be noted that there is a possibility that noise is applied to the image sensing device 21 or to the image pickup unit 20 due to a magnetic field produced by the motor 47 of the centrifugal fan 40. To prevent this, a magnetic shield member can be disposed between the device plate 23 and the centrifugal fan 40 so as to cover the image sensing device 21 as viewed in the optical axis direction. For example, a thin substantially rectangular magnetic shield member can be affixed to a flat portion of the device plate 23 other than the convex portion 23a and the concave portion thereof.

Figure 11:
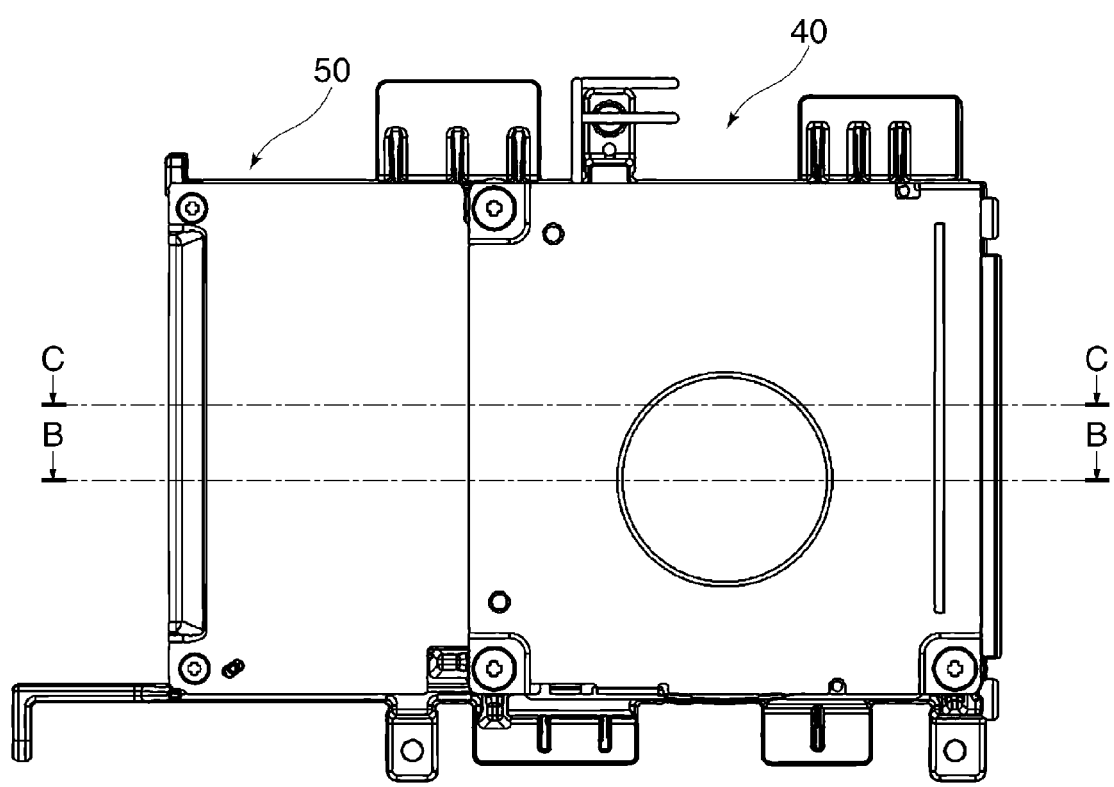
FIG. 11 is a front view of the fan duct unit.
Figure 12:
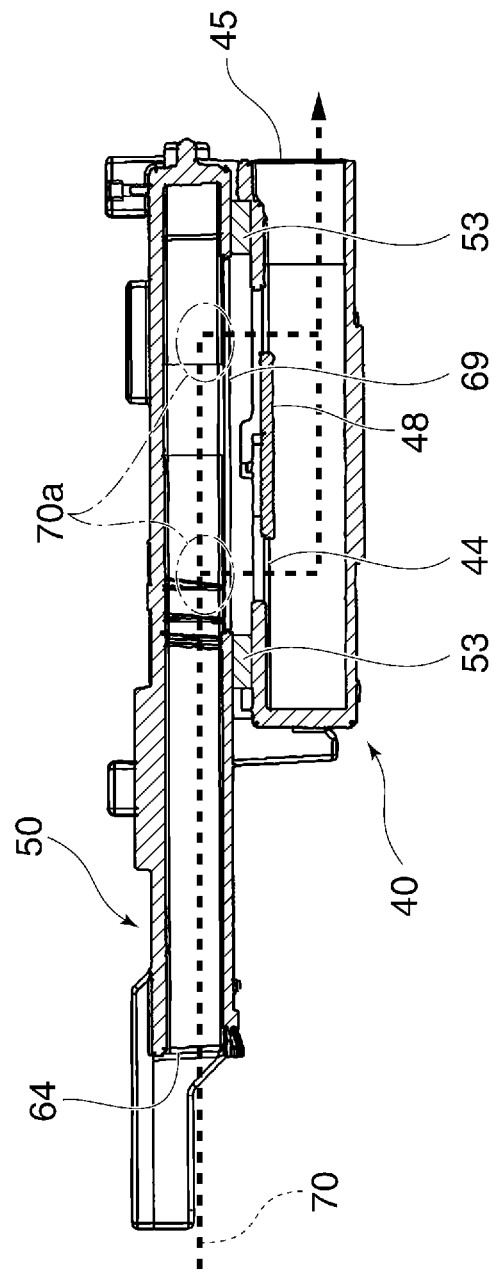
FIG. 12 is a section view taken along line B-B shown in FIG. 11.
Figure 13:
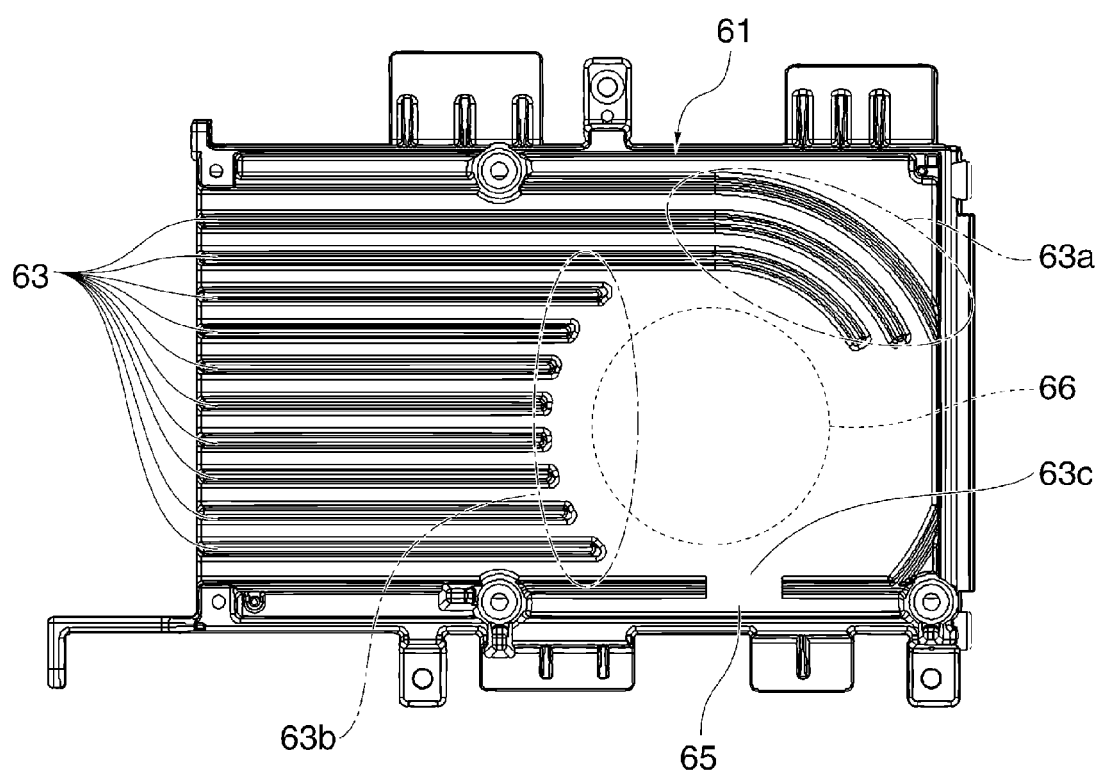
FIG. 13 is a view showing in detail a structure of a heat sink.
Figure 14A:
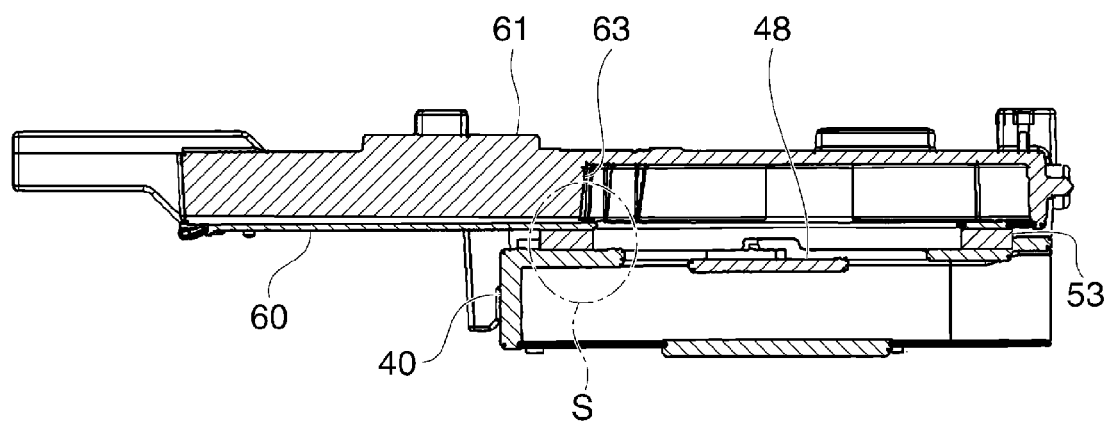
FIG. 14A is a section view taken along line C-C shown in FIG. 11.
Figure 14B:
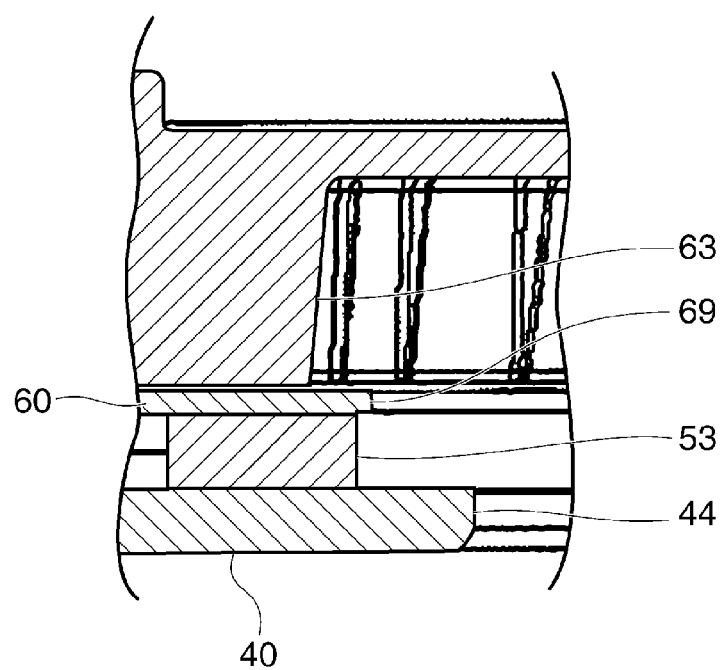
FIG. 14B is an enlarged view of an S part shown in FIG. 14A.

Next, a description will be given of a fan duct unit with reference to FIGS. 8 to 14. FIGS. 8 to 11 respectively show the fan duct unit in exploded perspective view, in front perspective view, in another front perspective view, and in front view. FIG. 12 is a section view taken along line B-B shown in FIG. 11, FIG. 13 shows in detail a structure of the heat sink 61, FIG. 14A is a section view taken along line C-C shown in FIG. 11, and FIG. 14B shows an S part of FIG. 14A in enlarged view. It should be noted that in FIGS. 12 and 14A, illustrations of the blades 46 and the motor 47 are omitted for convenience of explanation.

Figure 8:
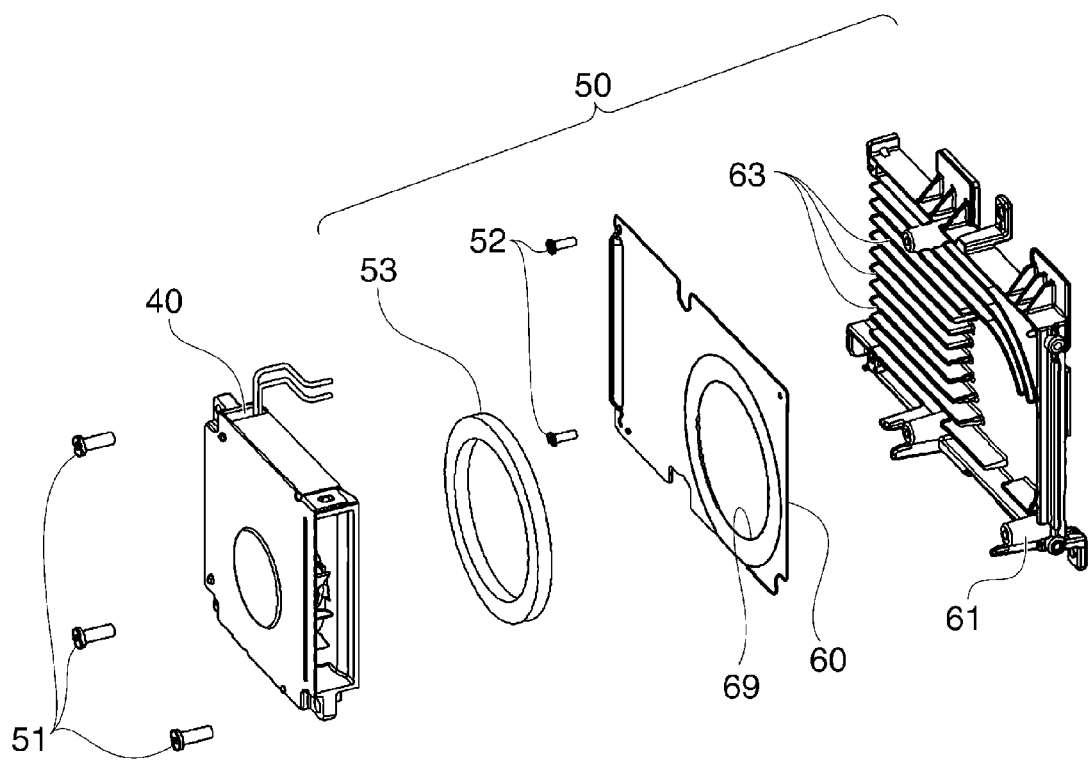
FIG. 8 is an exploded perspective view of a fan duct unit.
Figure 9:
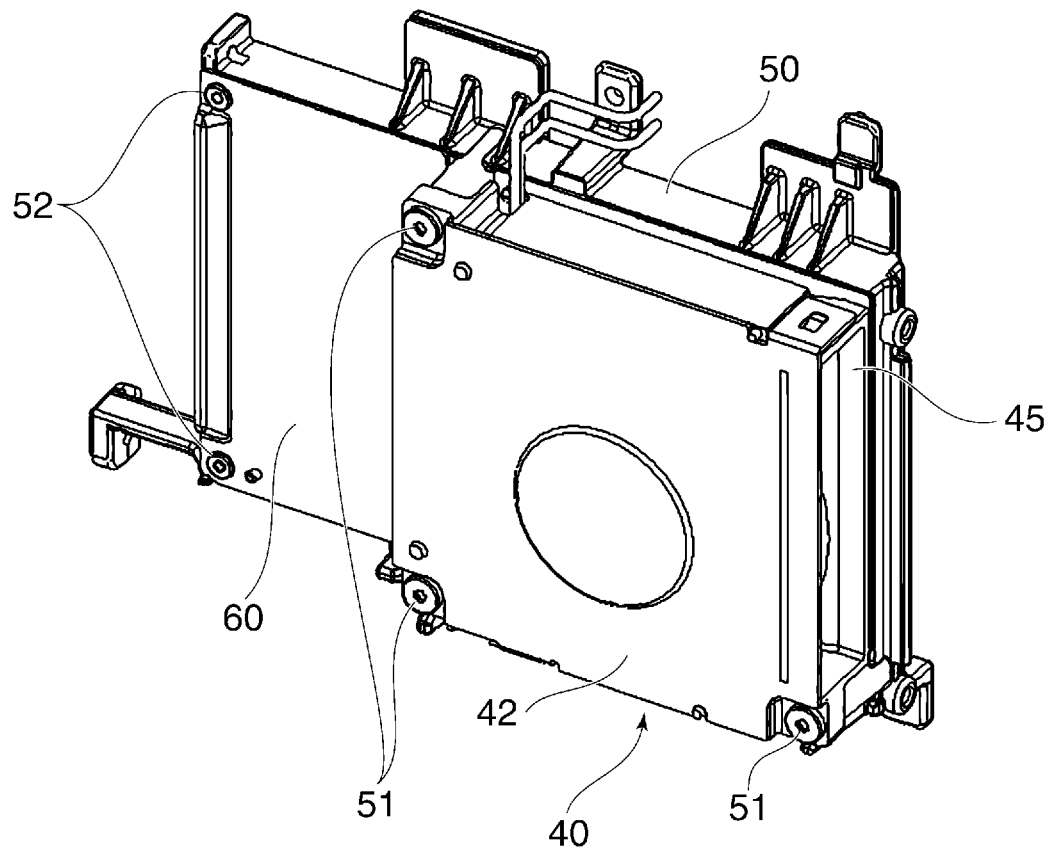
FIG. 9 is a front perspective view of the fan duct unit.
Figure 10:
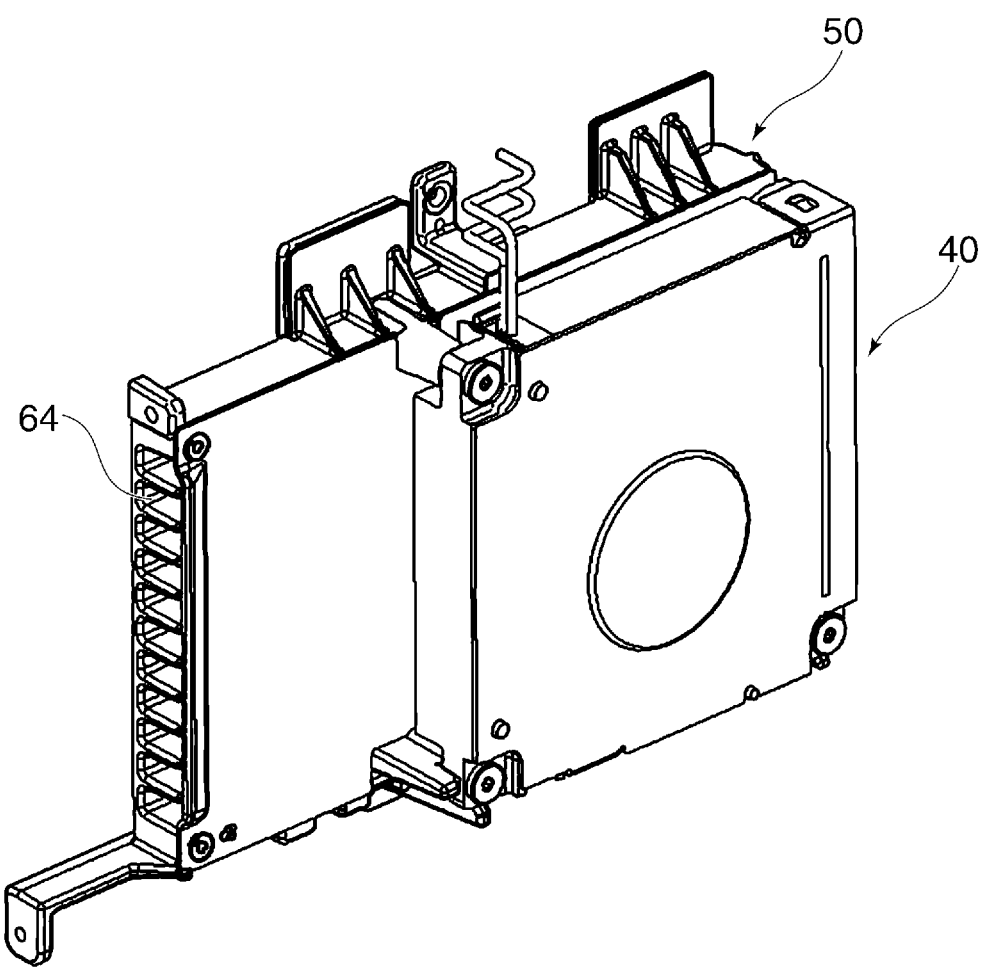
FIG. 10 is another front perspective view of the fan duct unit.

As shown in FIG. 8, the fan duct unit includes the centrifugal fan 40 and the heat sink-cum-duct 50. The heat sink-cum-duct 50 includes the heat sink 61, a plate 60 formed with an opening 69, and an elastic member 53. The plate 60 is formed by e.g. an aluminum plate and fixed to the heat sink 61 by screws 52. The centrifugal fan 40 is fixed to the heat sink 61 by screws 51.

The heat sink 61 is formed by e.g. aluminum die casting into substantially a rectangular shape, and has a plurality of fins 63 for increasing a heat radiation area. A side of the heat sink 61 where the fins 63 are formed is covered by the plate 60, whereby the heat sink 61 achieves a duct function. The heat sink 61 is formed at its one side with an air inlet port 64 (FIG. 10) communicating with the air inlet port 44 of the centrifugal fan 40.

The elastic member 53 is formed into a ring shape, is affixed to the plate 60 so as to surround the opening 69, and is disposed between the centrifugal fan 40 and the heat sink-cum-duct 50. Since the elastic member 53 which is in a compressed state tightly closes between the heat sink-cum-duct 50 and the centrifugal fan 40, air passing through the opening 69 of the plate 60 does not leak until it is sucked into the air inlet port 44 of the centrifugal fan 40.

As shown in FIG. 12, an air flow 70 is generated in the fan duct unit. More specifically, air sucked from the air inlet port 64 of the heat sink-cum-duct 50 flows into the heat sink-cum-duct 50, and a moving direction of the air is changed by about 90 degrees at a direction changing portion 70a. Then, the air flows into the air inlet port 44 of the centrifugal fan 40 in a direction nearly parallel to the rotation axis of the centrifugal fan 40 by way of the opening 69 of the heat sink-cum-duct 50. The air entered from the air inlet port 44 into the centrifugal fan 40 alters its moving direction by nearly 90 degrees, and is discharged from the air outlet port 45 of the centrifugal fan 40.

As shown in FIG. 13, plural fins 63 of the heat sink 61 are provided to extend in a width direction of the camera main unit 10 and to be apart from one another in a height direction of the camera main unit 10. The heat sink 61 has an opening area 66 corresponding to a circular opening of the air inlet port 44 of the centrifugal fan 40. The opening area 66 is formed into a circular shape and provided such that the center of the opening area 66 is aligned with the center of rotation of the centrifugal fan 40. The plural fins 63 have their ends 63a, 63b that are extended toward the opening area 66 and disposed substantially on a circle concentric with the opening area 66 and radially outward of the opening area 66. This make it possible to suppress increase of ventilation resistance, while increasing surface areas of the plural fins 63 as large as possible.

A reservoir 65 that temporarily stores dust and liquid is provided between a lowest one of the plural fins 63 and a lower wall of the heat sink 61. The lowest fin 63 is formed with a notch 63c through which the opening area 66 is communicated with the reservoir 65.

As shown in FIG. 14B, the opening 69 of the plate 60 of the heat sink-cum-duct 50 is formed to correspond to the air inlet port 44 of the centrifugal fan 40, and is larger than the opening of the air inlet port 44. The plural fins 63 are disposed diametrically outward of the opening 69 of the plate 60. The elastic member 53 is disposed diametrically outward of the opening of the air inlet port 44 in a state compressed between the centrifugal fan 40 and the plate 60.

The image pickup apparatus such as digital camera is often used outdoor. It is therefore necessary to prevent a failure of the centrifugal fan 40 and electric short-circuit in the fan circuit board 48 even in dust environment, rain water environment, etc. In this embodiment, the following countermeasure is taken to make it difficult for foreign matters such as dust and liquid such as rain water to enter the centrifugal fan 40.

In the fan duct unit, there is generated the air flow 70, as previously described with reference to FIG. 12, where the air flowing into the heat sink-cum-duct 50 through the air inlet port 64 is changed in moving direction by about 90 degrees at the direction changing portion 70a, and then enters the air inlet port 44 of the centrifugal fan 40 by way of the opening 69 of the heat sink-cum-duct 50 and is discharged from the air outlet port 45 of the centrifugal fan 40.

Dust, rain water, etc. having mass are sucked from the air inlet port 64 of the heat sink-cum-duct 50 together with air, and move while being accelerated. At the direction changing portion 70a where the moving direction of the air entered the heat sink-cum-duct 50 is changed by about 90 degrees, the dust, rain water, etc. having mass move in straight lines by inertia, and subsequently collide with a wall surface (or in the vicinity thereof) disposed facing the air inlet port 64 of the heat sink-cum-duct 50.

In an ordinary photographing state, the heat sink-cum-duct 50 takes an orientation where it is nearly perpendicular to the direction of gravity. In such orientation, the notch 63c and reservoir 65 of the heat sink 61 are disposed below the direction changing portion 70a of the air flow 70, as viewed in the direction of gravity. Since the notch 63c is formed gradually narrower toward the reservoir 65, it is easy for the rain water, dust, etc. to enter the reservoir 65 but difficult for them to go out of the reservoir 65. Thus, the rain water, dust, etc. entered through the notch 63c into the reservoir 65 are prevented from getting again on the air flow 70.

Water-absorbing members made of an open-cell material (e.g., sponge) or adhesive members such as double-sided adhesive tapes are disposed on the wall surface of the heat sink-cum-duct 50 with which dust, rain water, etc. collide, and disposed on near the wall surface and on an inner wall surface of the reservoir 65. It is therefore possible to enhance the effect of preventing dust, rain water, etc. entered the reservoir 65 from getting again on the air flow 70. Liquid such as rain water temporarily stored in the reservoir 65 gradually evaporates due to heat of the heat sink 61 and is discharged together with inflow air.

The elastic member 53 disposed between the centrifugal fan 40 and the heat sink-cum-duct 50 is also formed by a water-absorbing member that absorbs liquid such as rain water before entering the centrifugal fan 40, whereby the fan circuit board 48 is prevented from being electrically short-circuited. By disposing an adhesive member such as a double-sided adhesive tape near the elastic member 53, e.g., around the opening of the air inlet port 44 of the centrifugal fan 40, it is possible to prevent dust or the like from entering the centrifugal fan 40.

Figure 15:
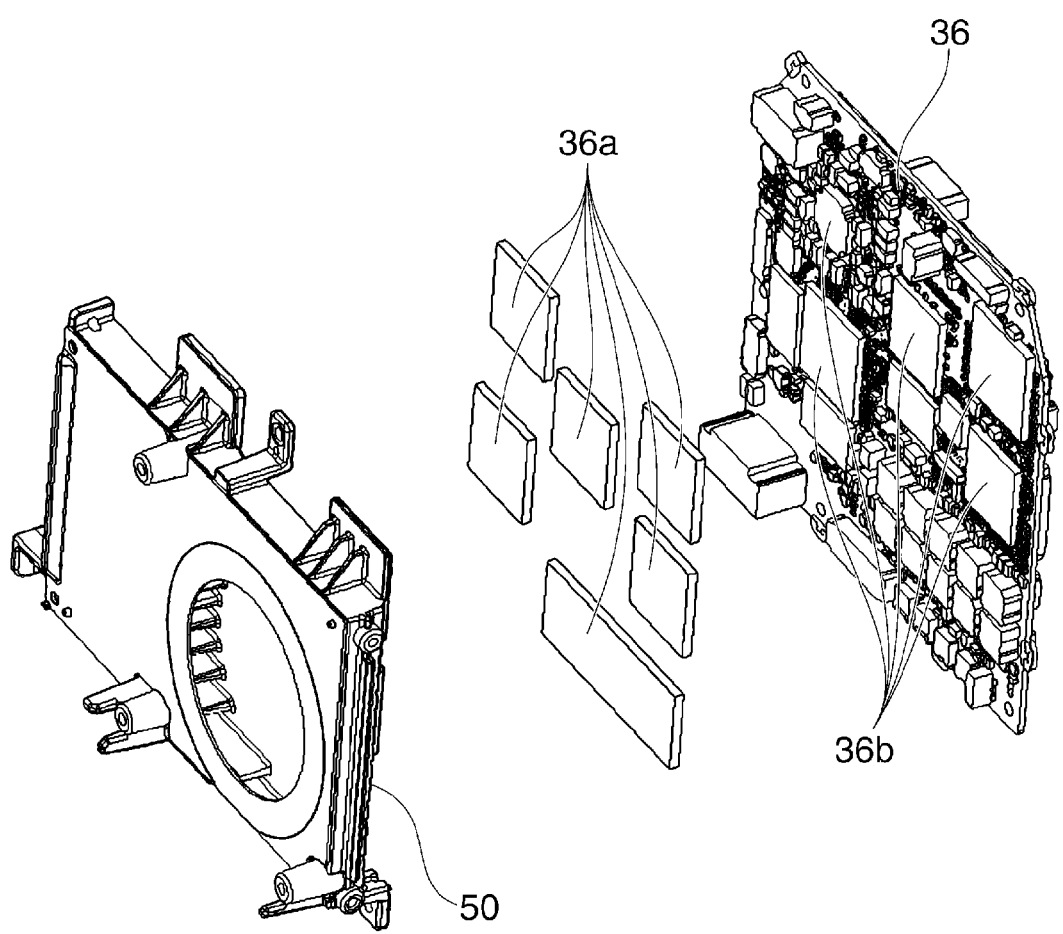
FIG. 15 is a perspective view showing the arrangement of a main circuit board, heat radiation rubbers, and a heat sink-cum-duct.
Figure 16:
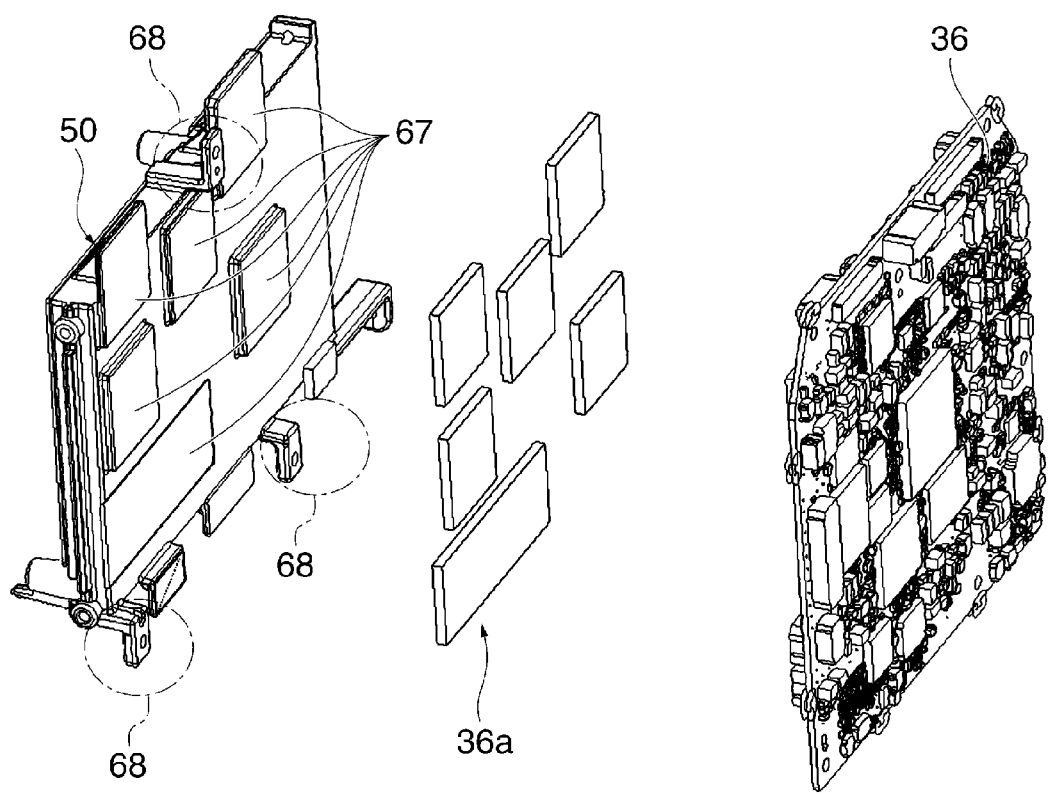
FIG. 16 is another perspective view showing the arrangement of the main circuit board, the heat radiation rubbers, and the heat sink-cum-duct.
Figure 17:
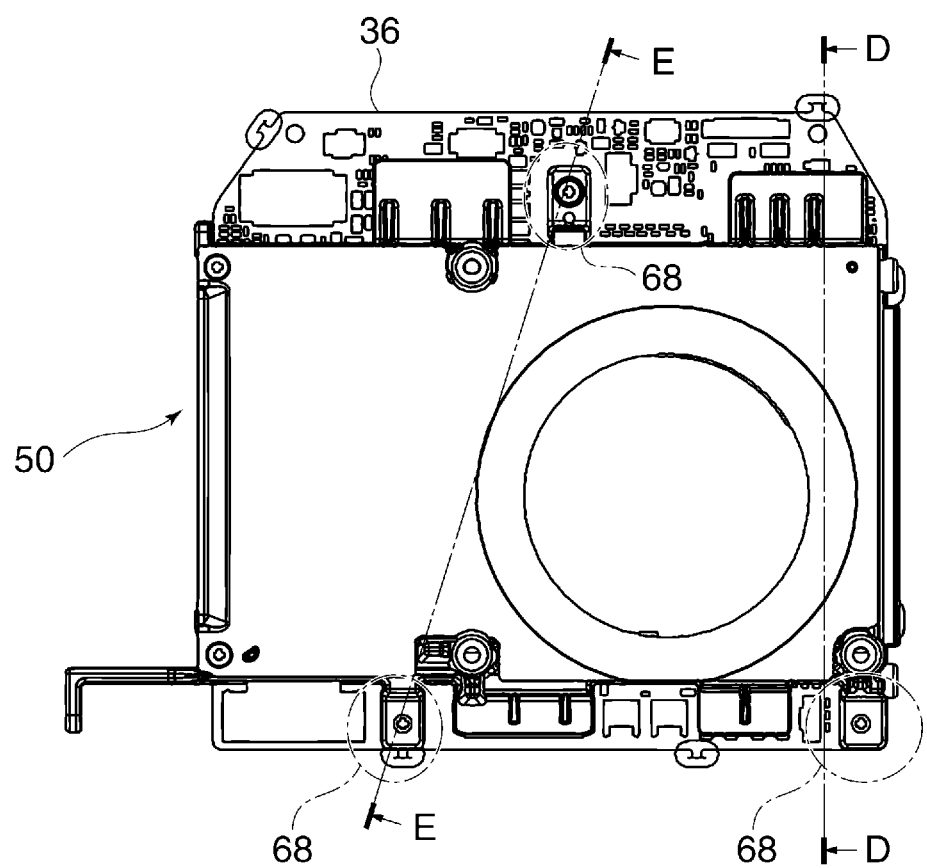
FIG. 17 is a front view showing a state where the heat sink-cum-duct and the main circuit board are assembled together, with the heat radiation rubbers interposed therebetween.
Figure 18A:
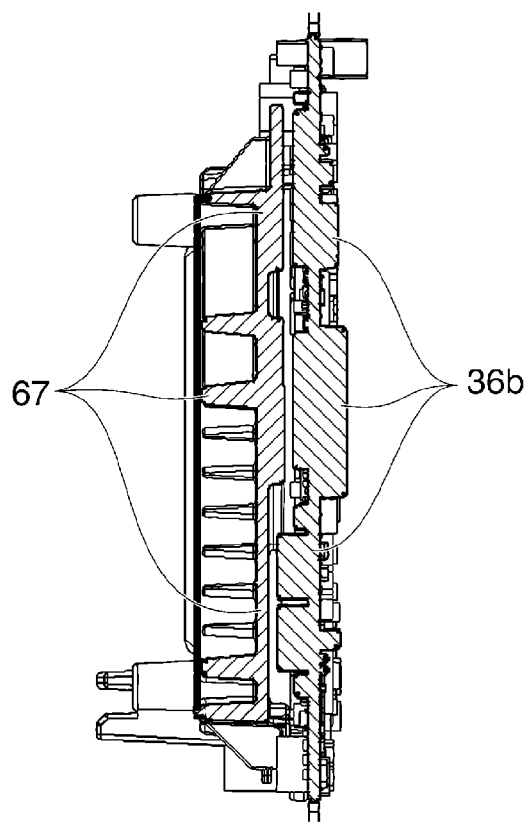
FIG. 18A is a section view taken along line D-D shown in FIG. 17.
Figure 18B:
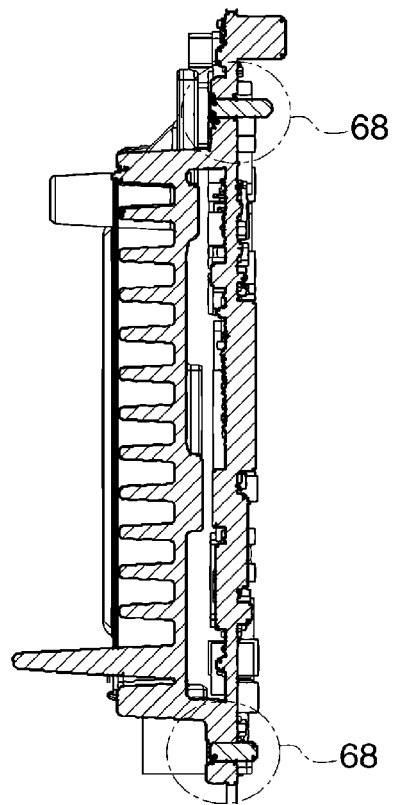
FIG. 18B is a section view taken along line E-E shown in FIG. 17.

FIGS. 15 and 16 show in perspective view the arrangement of the main circuit board 36, heat radiation rubbers 36a, and heat sink-cum-duct 50. FIG. 17 shows in front view a state where the heat sink-cum-duct 50 and the main circuit board 36 are assembled together, with the heat radiation rubbers 36a interposed therebetween. FIGS. 18A and 18B are section views respectively taken along line D-D and line E-E shown in FIG. 17. It should be noted that in FIGS. 18A and 18B, an illustration of the heat radiation rubbers 36a is omitted for convenience of explanation.

As shown in FIG. 15, the main circuit board 36 is disposed on the rear face side of the heat sink-cum-duct 50, and mounted with a large number of circuit elements 36b, which are high in amount of heat generation or high in power consumption or low in guaranteed temperature and from which heat must be radiated. It is preferable that circuit elements that are low in guaranteed temperature be disposed near the air inlet port 64, whereby heat can effectively be radiated therefrom. Heat radiation elastic members (heat radiation rubbers 36a in this embodiment) corresponding to the circuit elements 36b each have thermal conductivity and elasticity, but are inferior in thermal conductivity as compared to the heat sink 61. It is therefore preferable to make the heat radiation rubbers 36a thin as much as possible. By using the heat radiation rubbers 36a that are made thin in thickness, a heat transfer loss from the circuit elements 36b to the heat sink 61 can be reduced.

As shown in FIG. 16, the heat sink-cum-duct 50 has concave-convex portions 67 corresponding to the heat radiation rubbers 36a and the circuit elements 36b. The concave-convex portions 67 are formed on the side close to the main circuit board 36 and constitute a part of the heat sink 61.

As shown in FIG. 17, the heat sink-cum-duct 50 and the main circuit board 36 are assembled together in such a manner that the main circuit board 36 is almost covered by the heat sink-cum-duct 50, whereby heat can be radiated with high efficiency. The heat radiation rubbers 36a are sandwiched between the circuit elements 36b and the concave-convex portions 67 so as to be in close contact therewith.

As shown in FIG. 18A, the concave-convex portions 67 have different concave-convex heights according to heights of the circuit elements 36b such that gaps between the concave-convex portions 67 and the circuit elements 36b become minimized and become equal to one another in the assembly of the heat sink-cum-duct 50 and the main circuit board 36. Thus, the heat radiation rubbers 36a disposed between the heat sink-cum-duct 50 and the main circuit board 36 can have minimum uniform thicknesses, whereby heat can be transferred from the main circuit board 36 to the heat sink-cum-duct 50 with high efficiency.

The heat sink-cum-duct 50 has a ventilation path side, opposite from the concave-convex portions 67, which is formed into a flat shape, whereby the heat radiation efficiency can be improved while suppressing increase of the ventilation resistance of the heat sink-cum-duct 50.

As shown in FIGS. 16, 17, and 18B, the heat sink 61 has three leg portions 68 that are provided in direct contact with parts of the main circuit board 36 where a ground pattern is exposed. These leg portions 68 are mechanically connected to the main circuit board 36. Thus, heat of the main circuit board 36 can directly be transferred to the heat sink 61.

In addition, the number of component parts interposed between the heat sink 61 and the main circuit board 36 can be minimized, and fabrication variation of the component parts can be minimized. In this embodiment, fabrication variation that corresponds to a variation in fabrication sizes from a contact surface between the heat sink 61 and the main circuit board 36 to the concave-convex portions 67 is only caused on the side of heat sink 61, and fabrication variation that corresponds to the sum of liftoff of the circuit elements 36b from the contact surface between the heat sink 61 and the main circuit board 36 and a height tolerance of the circuit elements 36b is only caused on the side of main circuit board 36.

Accordingly, gaps between the concave-convex portions 67 and the circuit elements 36b can be made small, and thicknesses of the heat radiation rubbers 36a can be minimized. As a result, the assembly of the main circuit board 36 and the heat sink-cum-duct 50 can be reduced in dimension in the optical axis direction, and heat can be transferred from the main circuit board 36 to the heat sink-cum-duct 50 with high efficiency.

Figure 19:
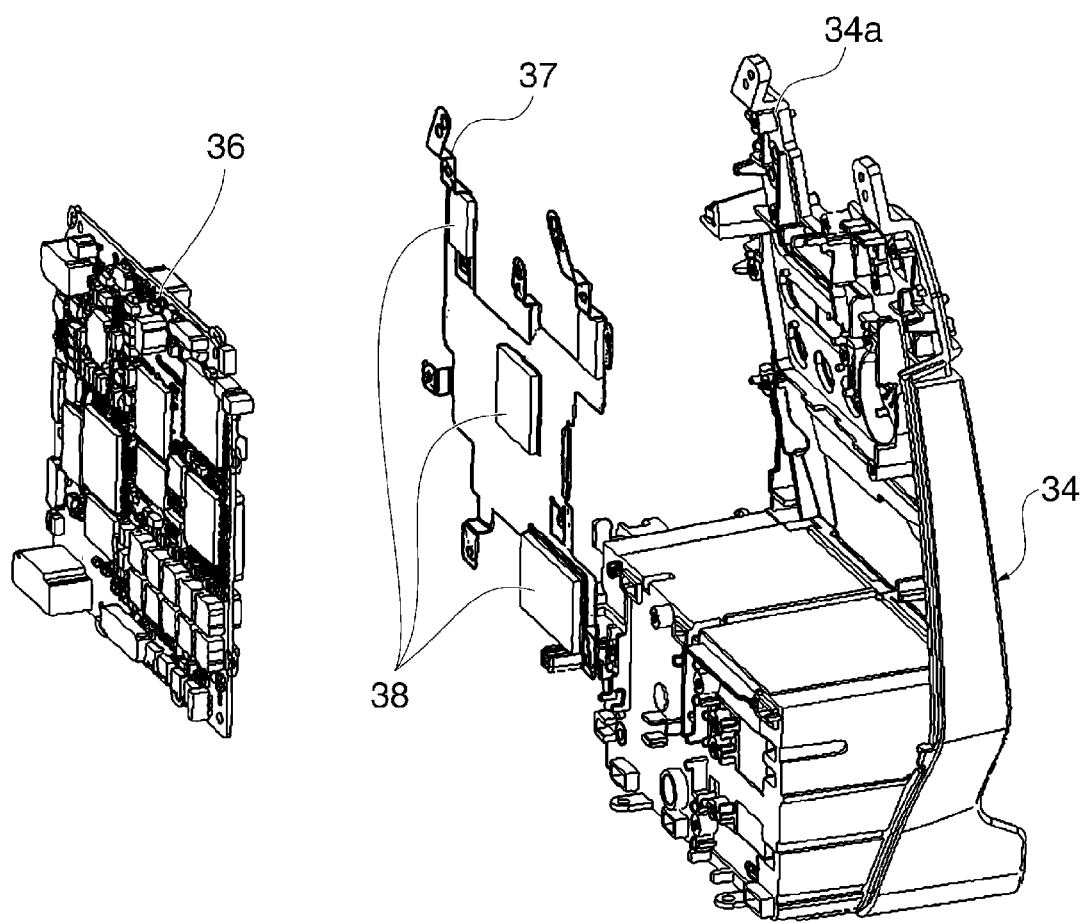
FIG. 19 is a perspective view showing the arrangement of the main circuit board, heat radiation plate, and rear cover unit.
Figure 20:
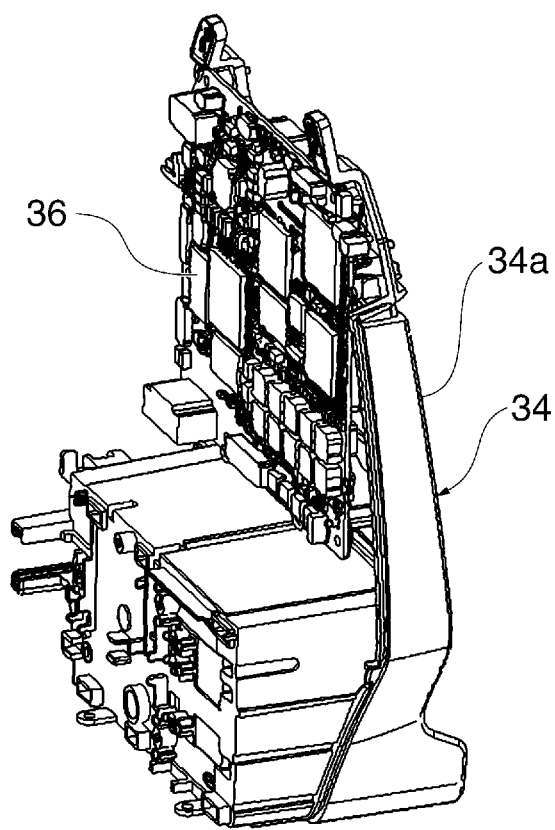
FIG. 20 is a perspective view showing a state where the main circuit board, the heat radiation plate, and the rear cover unit are assembled together.

FIG. 19 shows in perspective view the arrangement of the main circuit board 36, heat radiation plate 37, and rear cover unit 34. FIG. 20 shows in perspective view a state where the main circuit board 36, heat radiation plate 37, and rear cover unit 34 are assembled together.

As shown in FIGS. 19 and 20, heat generated in the main circuit board 36 is transferred through heat radiation rubbers 38 and the heat radiation plate 37 to the rear cover 34*a* of the rear cover unit 34 and radiated from the rear cover 34*a*. The heat radiation plate 37 is disposed on a rear face side of the main circuit board 36, radiates heat of the circuit elements 36*b* of the main circuit board 36, and prevents heat spots (locally hot places) from occurring. Thus, even if the main circuit board 36 is disposed near the rear cover 34*a*, any part of the surface of the rear cover 34*a* is prevented from becoming locally hot.

Heat generated in the main circuit board 36 is transferred to the heat sink-cum-duct 50 and air cooled by the centrifugal fan 40, as previously described.

Figure 21:
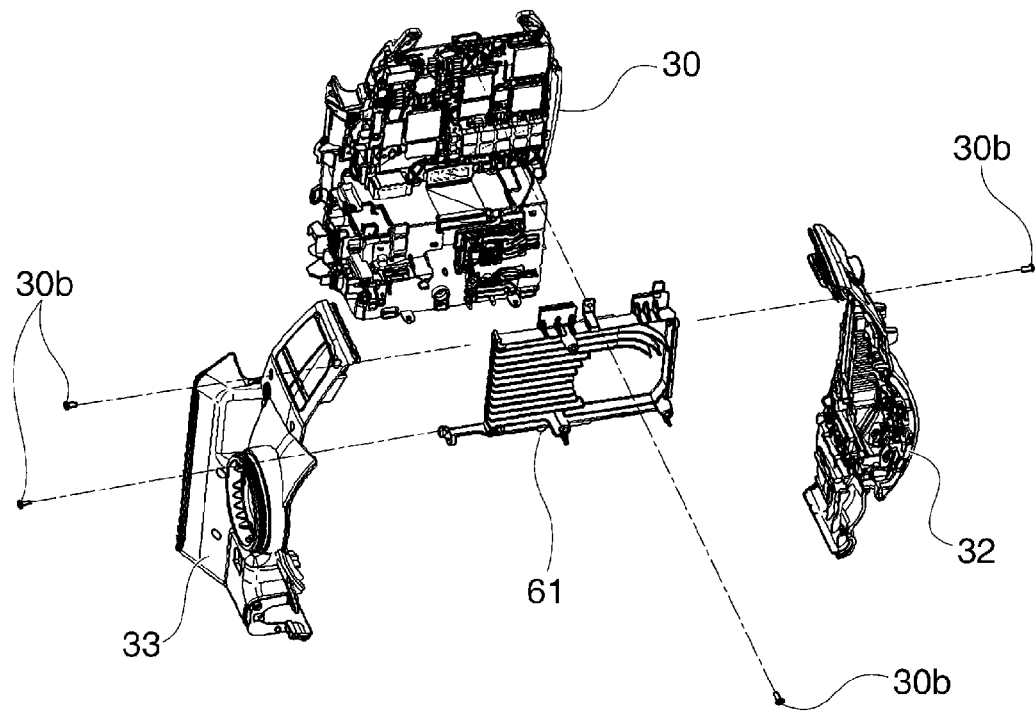
FIG. 21 is a perspective view showing the heat sink, left and right cover units, and the rear unit.

FIG. 21 shows the heat sink 61, left cover unit 32, right cover unit 33, and rear unit 30 in perspective view. Hereinafter, an assembly of the main circuit board 36, heat radiation plate 37, and rear cover unit 34 will be referred to as the rear unit 30.

The heat sink 61 is, e.g., an aluminum die cast molded product. More specifically, the heat sink 61 is made of a material that has higher thermal conductivity and higher rigidity than those of the left cover unit 32, right cover unit 33, and rear unit 30 which are plastic molded products made of PC (polycarbonate) resin, ABS resin, or the like.

As shown in FIG. 21, the left cover unit 32 is fixed to the heat sink 61 by one screw 30*b*, while the right cover unit 33 is fixed to the heat sink 61 by two screws 30*b*. The heat sink 61 is fixed to the rear unit 30 by one screw 30*b*.

Figure 22:
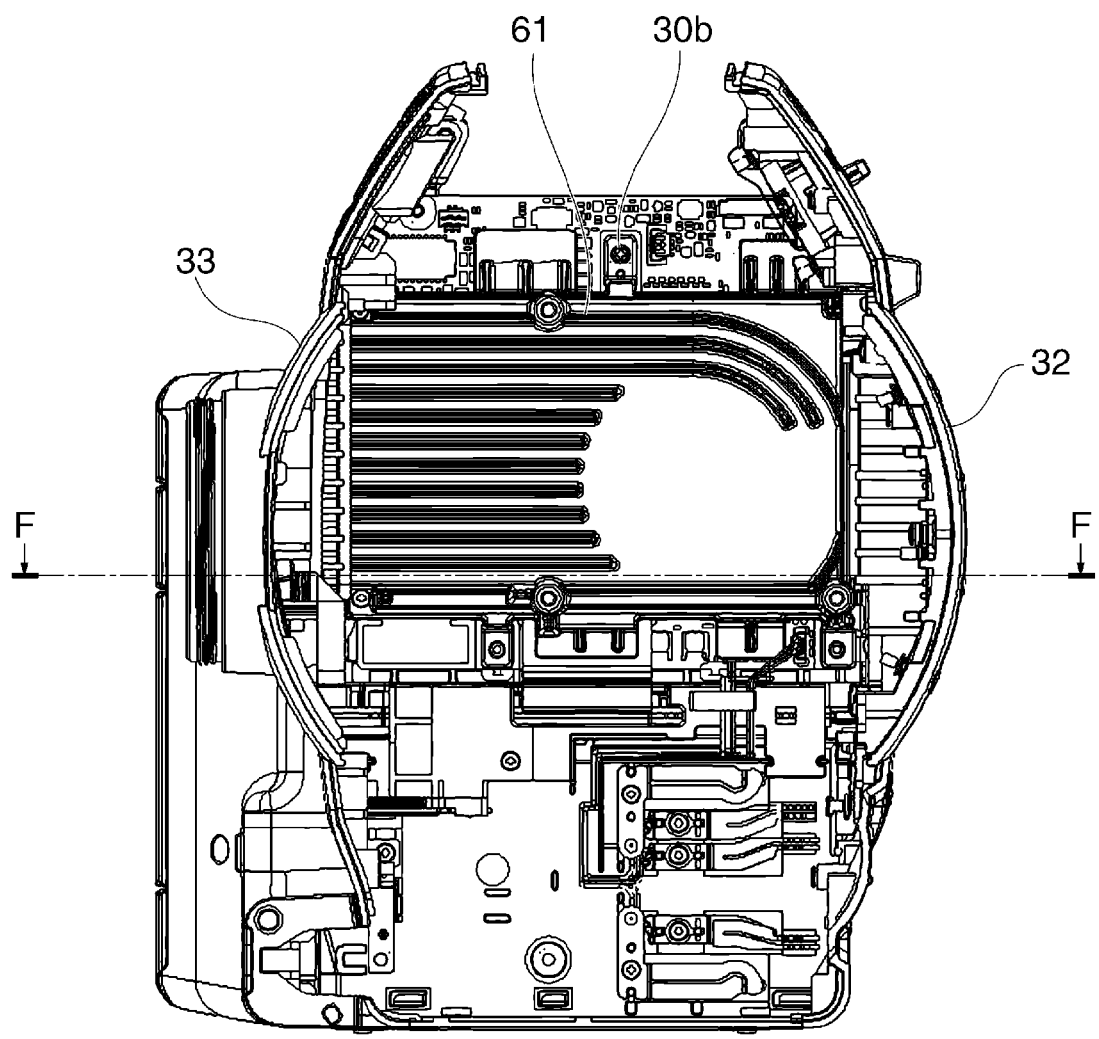
FIG. 22 is a front view showing a state where the heat sink, the left and right cover units, and the rear unit are assembled together.

FIG. 22 shows in front view a state where the heat sink 61, left cover unit 32, right cover unit 33, and rear unit 30 are assembled together.

As shown in FIG. 22, the heat sink 61 is disposed between the left and right cover units 32, 33, which are disposed facing each other in the width direction of the camera main unit 10. The cover units 32, 33 are fixed to the heat sink 61 by the screws 30*b*, whereby the rigidity of the camera main unit 10 against external compression and torsion can be increased.

Figure 23:
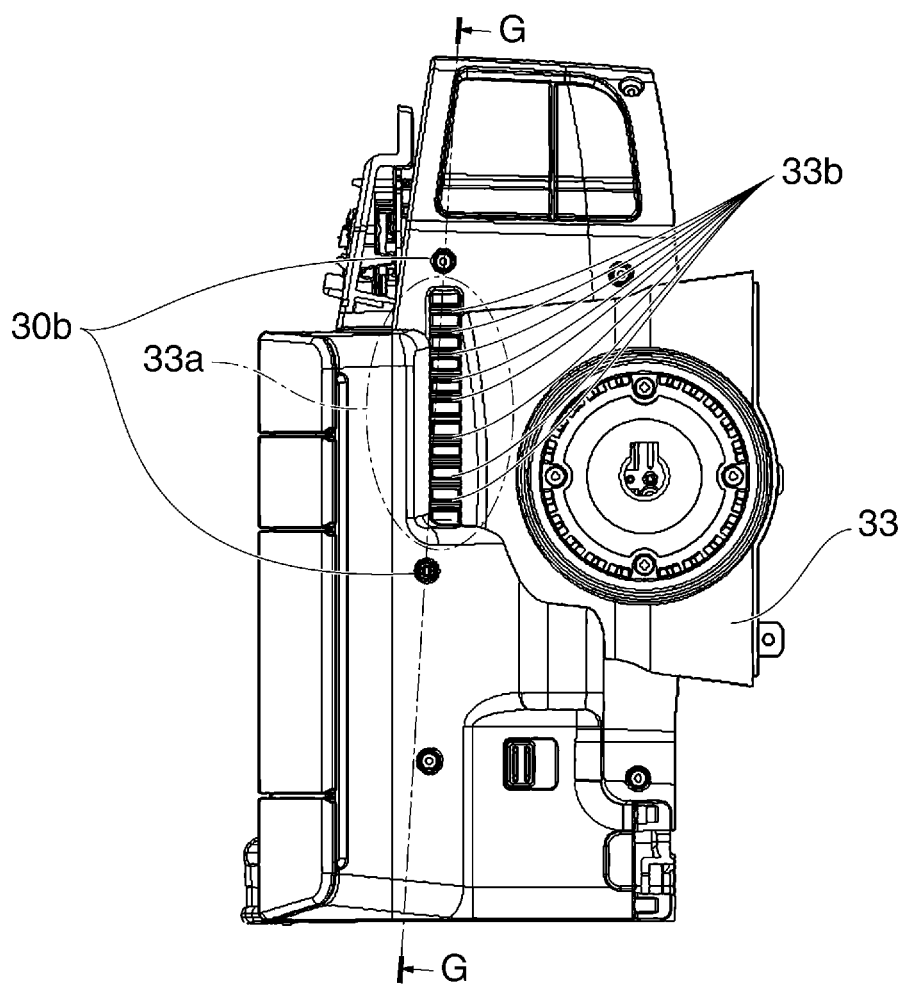
FIG. 23 is a right side view of the assembly shown in FIG. 22.

FIG. 23 shows in right side view the assembly of FIG. 22. The right cover unit 33 is formed with the air inlet port 33*a* for air cooling so as to correspond to the air inlet port 64 of the heat sink-cum-duct 50. In the air inlet port 33*a*, a plurality of ribs 33*b* are disposed in a vertical direction of the camera main unit 10, so that a user's finger or the like is prevented from being in contact with the heat sink 61.

Figure 24:
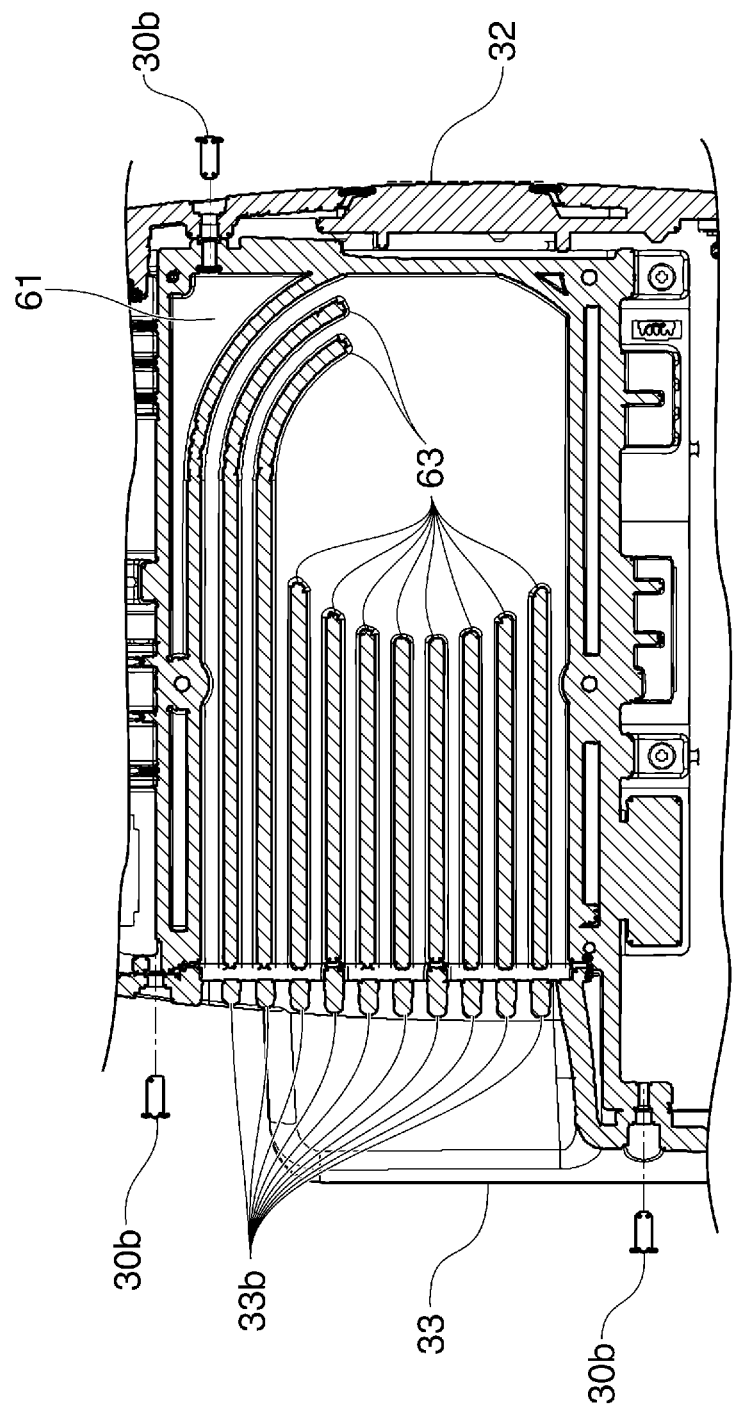
FIG. 24 is a section view taken along line G-G shown in FIG. 23.
Figure 25A:
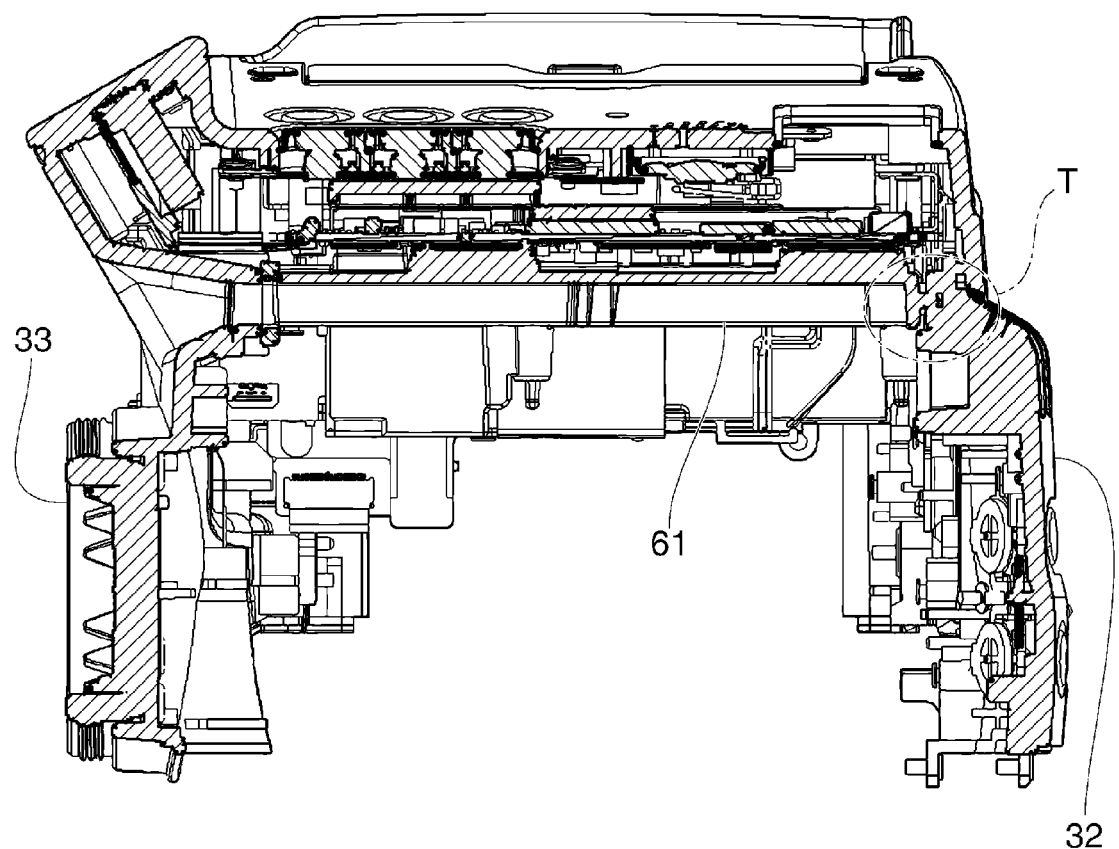
FIG. 25A is a section view taken along line F-F shown in FIG. 22.
Figure 25B:
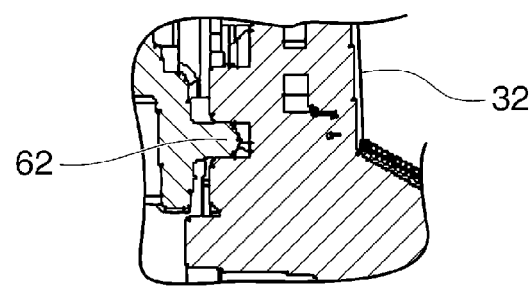
FIG. 25B is an enlarged view of a T part shown in FIG. 25A.

FIG. 24 is a section view taken along line G-G shown in FIG. 23, FIG. 25A is a section view taken along line F-F in FIG. 22, and FIG. 25B shows a T part of FIG. 25A in enlarged view.

As shown in FIG. 24, the ribs 33*b* of the right cover unit 33 and the fins 63 of the heat sink 61 are disposed in alignment with one another in the height direction of the camera main unit 10, whereby ventilation resistance and wind noise can be reduced. In addition, the rigidity of the ribs 33*b* can be increased since the ribs 33*b* are brought in contact with the fins 63, when pressed externally. Counterbored holes for the screws 30*b* are formed deep so as to prevent a user's finger from being in contact with the screws 30*b* to which heat of the heat sink 61 is transferred.

As shown in FIG. 25B, the heat sink 61 is provided with a rib 62 for concave-convex engagement with the left cover unit 32, thereby increasing the rigidity of the left cover unit 32. It should be noted that the rib 62 is provided to restrict positions of the heat sink 61 and the left cover unit 32 in the optical axis direction, but can be provided to restrict positions other than the positions in the optical axis direction.

Figure 26:
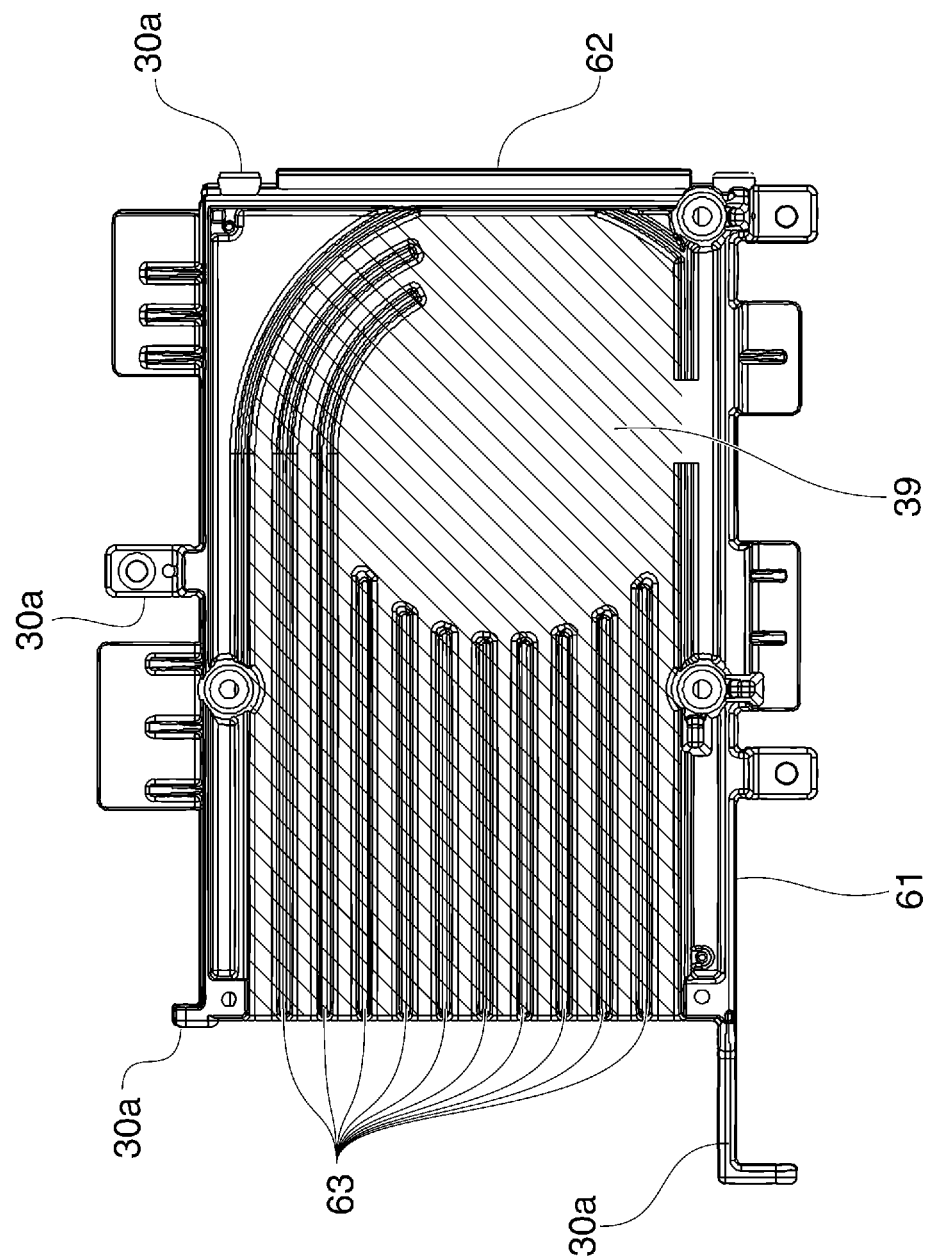
FIG. 26 is a view showing the heat sink in detail.

FIG. 26 shows the heat sink 61 in detail. As shown in FIG. 26, screw fixing portions 30*a* are provided in left-side upper and lower corner portions, in a right-side upper corner portion, and in an upper long side portion of the heat sink 61. The left cover unit 32 and right cover unit 33 are fixed to the heat sink 61 by the screws 30*b*, while the heat sink 61 is fixed to the rear unit 30 by the screw 30*b*, and the rib 62 is provided in a right short side portion of the heat sink 61, whereby the rigidities of the units 32, 33, 30 and the heat sink 61 are increased.

The screw fixing portions 30*a* and the rib 62 are disposed at positions in the optical axis direction where they do not overlap a ventilation path 39. Thus, the left and right cover units 32, 33 are fixed to portions of the heat sink-cum-duct 50 that do not overlap with the ventilation path 39 as viewed in the optical axis direction, and the heat sink 61 can be made small in dimension in the optical axis direction, while increasing the rigidities of the units 32, 33, 30 and the heat sink 61.

The heat sink 61 is disposed between the left and right cover units 32, 33 which are disposed facing each other in the width direction of the camera main unit 10. Thus, the air inlet port 33*a* can be provided in the right cover unit 33 and the air outlet port 26 can be provided in the left cover unit 32. As a result, it becomes possible to discharge air, while preventing hot air from hitting a user's hand holding the grip 12. The air inlet and outlet ports 33*a*, 26 are an example of ventilation ports. It should be noted that the air outlet and inlet ports can be provided at upper and lower positions in the vertical direction of the camera main unit 10.

As described above, according to this embodiment, the rigidity of the digital camera can be increased without adding reinforcing members, and the heat radiation efficiency can be improved to achieve a sufficient heat radiation effect.

Second Embodiment

Figure 28:
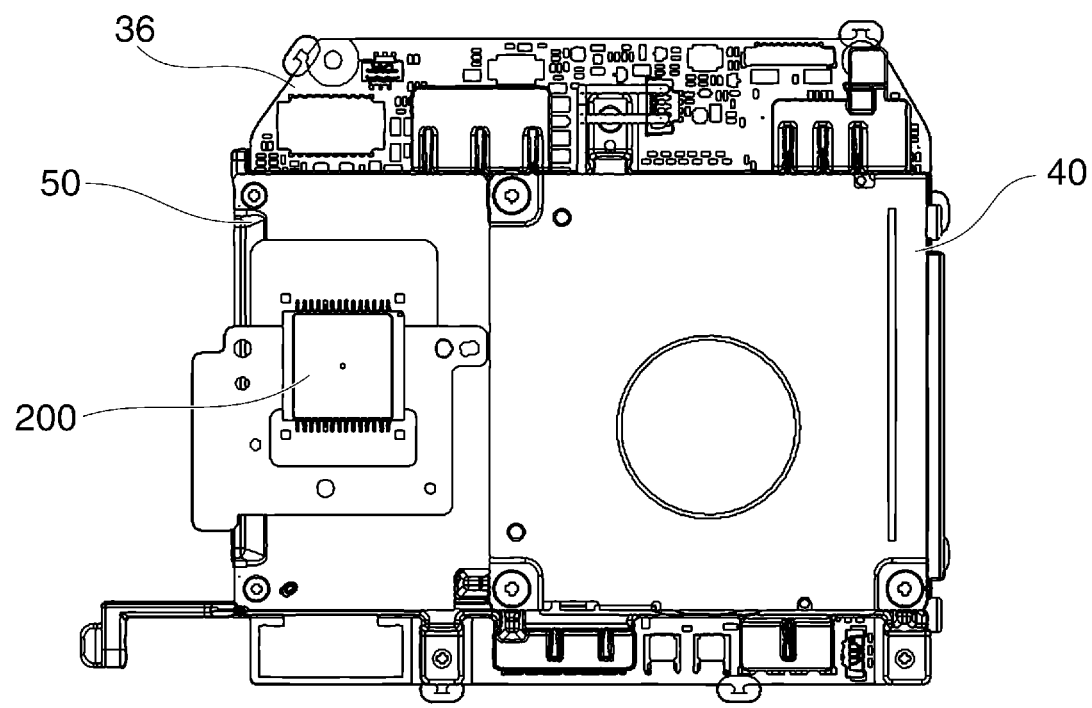
FIG. 28 is a view showing a state where the main circuit board, heat sink-cum-duct, and centrifugal fan are assembled together.
Figure 29:
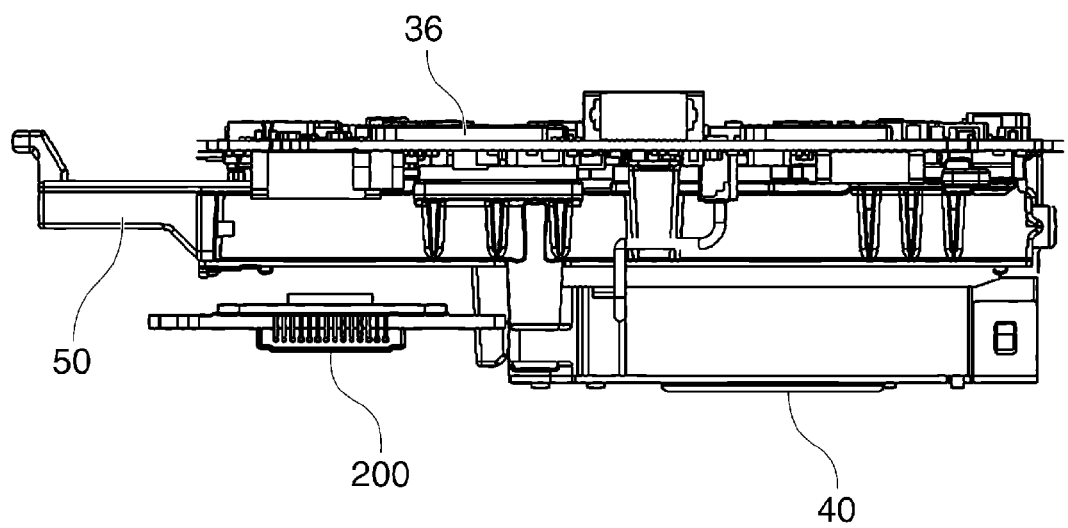
FIG. 29 is a top view of the assembly shown in FIG. 28.

Next, with reference to FIGS. 27 to 29, a description will be given of a digital camera serving as an image pickup apparatus according to a second embodiment of this invention. As compared to the first embodiment, this embodiment differs only in the arrangement of the image pickup unit. In the following, elements that are the same as those in the first embodiment will be denoted by the same reference numerals, and a description thereof will be omitted.

Figure 27:
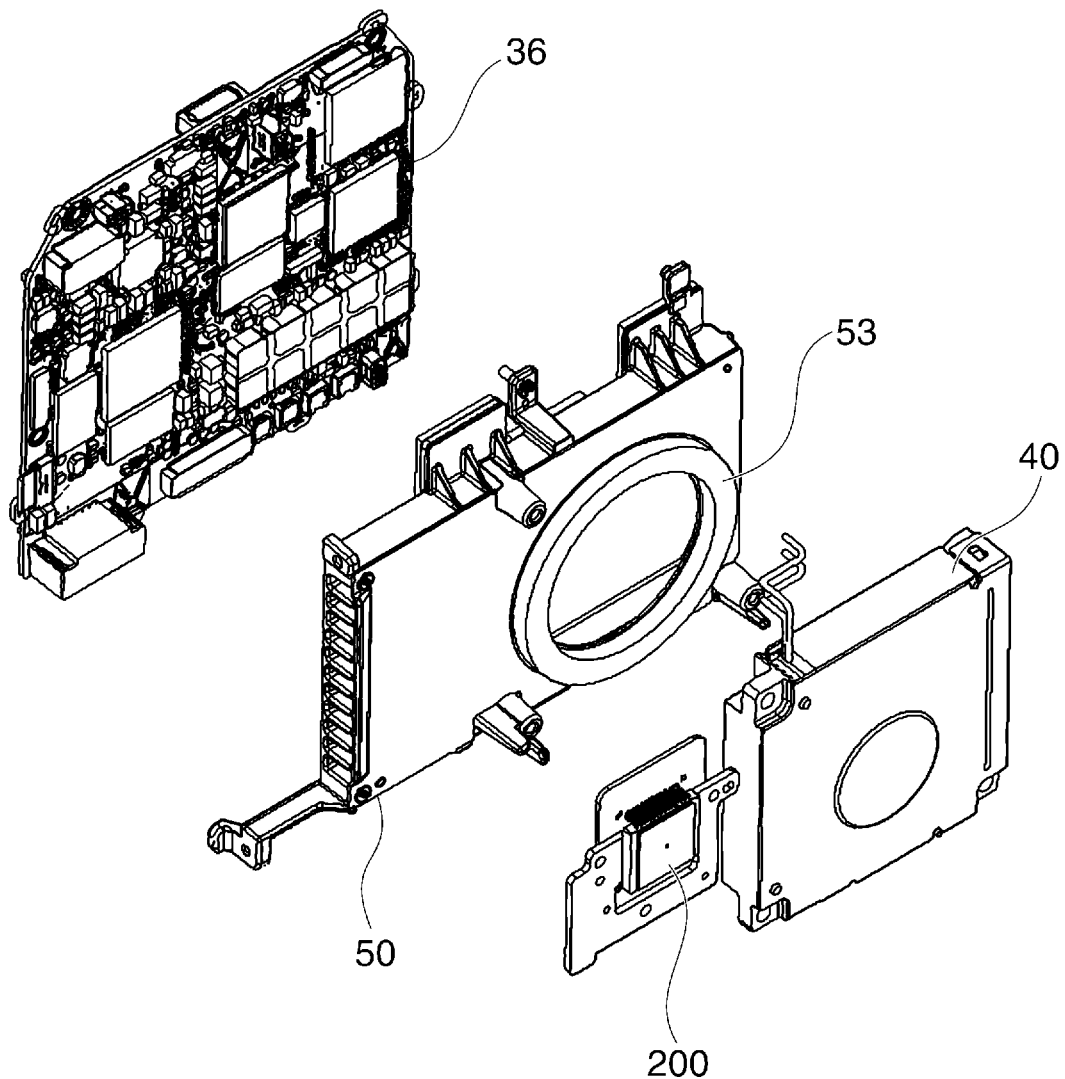
FIG. 27 is a perspective view showing the arrangement of a main circuit board, heat sink-cum-duct, elastic member, centrifugal fan, and image pickup unit in a digital camera serving as an image pickup apparatus according to a second embodiment of this invention.

FIG. 27 shows in perspective view the arrangement of the main circuit board 36, heat sink-cum-duct 50, elastic member 53, centrifugal fan 40, and image pickup unit 200. FIG. 28 shows a state where the main circuit board 36, heat sink-cum-duct 50, and centrifugal fan 40 are assembled together, and FIG. 29 shows in top view the assembly shown in FIG. 28.

In the first embodiment, the image pickup unit 20 and the centrifugal fan 40 are disposed on the optical axis so as to be nearly parallel to each other. On the other hand, in this embodiment, the image pickup unit 200 and the centrifugal fan 40 are disposed on substantially the same plane that extends in the width direction of the camera main unit 10, which is perpendicular to the optical axis. It is therefore possible to reduce the length dimension of the camera main unit 10 in the optical axis direction to make the unit 10 thinner, as compared to the first embodiment.

In this embodiment, the front cover unit 31 has a different shape and the lens barrel 11 is disposed at a different position as compared to the first embodiment, but other constructions, functions, and effects are the same as those of the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-186554, filed Aug. 27, 2012, which is hereby incorporated by reference herein in its entirety.

What is claimed is:

1. An image pickup apparatus comprising:
an image pickup unit having an image sensing device;
a circuit board with a plurality of circuit elements mounted thereon;
an air cooling fan unit having an air inlet port and an air outlet port;
a heat sink unit having an inlet portion for sucking air from outside, an opening corresponding to the air inlet port of the air cooling fan, and a plurality of fins disposed in a ventilation path from the inlet portion to the opening; and
a pair of cover members disposed facing each other, providing left and right exteriors of the image pickup apparatus,
wherein the image pickup unit, the air cooling fan unit, the heat sink unit, and the circuit board are disposed along an optical axis,
wherein the air cooling fan unit is sandwiched between the image pickup unit and the heat sink unit,
wherein the heat sink unit is sandwiched between the air cooling fan unit and the circuit board, and
wherein each of the pair of cover members is directly fastened to the heat sink at both sides thereof in a lateral direction of the image pickup apparatus.

2. The image pickup apparatus according to claim 1, wherein the pair of cover members are fastened to portions of the heat sink unit that do not overlap with the ventilation path as viewed in a direction of the optical axis.

3. The image pickup apparatus according to claim 1, wherein the pair of cover members are fastened to corner portions and a side portion of the heat sink unit.

4. The image pickup apparatus according to claim 1, wherein the heat sink unit is made of a material that has a higher rigidity and a higher thermal conductivity than those of the pair of cover members.

5. The image pickup apparatus according to claim 1, wherein:
the pair of cover members are fastened to the heat sink unit with screws that are inserted into counterbored holes, and
the counterbored holes each have a depth that prevents a user's finger from being in contact with a corresponding one of the screws.

6. The image pickup apparatus according to claim 1, wherein one of the pair of cover members is provided with a ventilation port corresponding to the air inlet portion of the heat sink unit, and another cover member is provided with a ventilation port corresponding to the air outlet port of the air cooling fan unit.

7. The image pickup apparatus according to claim 1, wherein the heat sink unit has a substantially rectangular shape with a predetermined thickness in a direction of the optical axis and is elongated along a direction perpendicular to the optical axis direction in the lateral direction of the image pickup apparatus more than in an up and down direction of the image pickup apparatus, and is disposed between the pair of cover members.

8. The image pickup apparatus according to claim 1, further comprising:
a rear cover providing a rear exterior of the image pickup apparatus,
wherein the heat sink unit is directly fastened to the rear cover.

* * * * *